US012418418B2

(12) United States Patent
Bari

(10) Patent No.: US 12,418,418 B2
(45) Date of Patent: Sep. 16, 2025

(54) SYSTEM AND METHOD FOR BUILDING A TRUSTED NETWORK OF DEVICES

(71) Applicant: B Data Solutions Inc., Ancaster (CA)

(72) Inventor: Syed Bari, Ancaster (CA)

(*) Notice: Subject to any disclaimer, the term of this patent is extended or adjusted under 35 U.S.C. 154(b) by 70 days.

(21) Appl. No.: 17/478,342

(22) Filed: Sep. 17, 2021

(65) Prior Publication Data
US 2023/0091179 A1 Mar. 23, 2023

(51) Int. Cl.
H04L 9/00 (2022.01)
H04L 9/08 (2006.01)
H04L 9/12 (2006.01)
H04L 9/14 (2006.01)
H04L 9/32 (2006.01)

(52) U.S. Cl.
CPC .......... H04L 9/3236 (2013.01); H04L 9/0825 (2013.01); H04L 9/12 (2013.01); H04L 9/14 (2013.01); H04L 9/3265 (2013.01); H04L 9/50 (2022.05)

(58) Field of Classification Search
CPC ....... H04L 9/3236; H04L 9/0825; H04L 9/12; H04L 9/14; H04L 9/3265; H04L 9/50
See application file for complete search history.

(56) References Cited

U.S. PATENT DOCUMENTS 7,644,414 B2 * 1/2010 Smith ................ G06F 8/20
709/227
8,744,937 B2 * 6/2014 Seubert .............. G06Q 10/10
705/35

(Continued)

FOREIGN PATENT DOCUMENTS

CN 108632293 A 10/2018
CN 108880797 A 11/2018
(Continued)

OTHER PUBLICATIONS

Examiner Report from corresponding CA application No. 3,131,208, May 23, 2023.

Primary Examiner — Khang Do
(74) Attorney, Agent, or Firm — Own Innovation; Daniel Biggs; James W. Hinton

(57) ABSTRACT

Systems and methods for building a trusted network of devices with intrusion detection system (IDS) using blockchain IoT (BIoT) technology are provided. The method includes registering an IoT device on a plurality of blockchain network channels. The plurality of blockchain network channels include an authentication channel, data channel, remote channel, and security channel connected to corresponding servers to perform dedicated operations such as device authentication, data management, remote operation/access control, and intrusion detection. On successful authentication, the IoT device is allowed to access, store and retrieve data stored on the blockchain. The blockchain ledger is updated after each data transaction and a new wallet identity or encrypted keys for the IoT device are issued after each transaction. The method further includes receiving an operational instruction from a front-end device and authenticating from the blockchain record, the wallet identity, user permissions and validity of operation's parameters based on an organization's policies.

20 Claims, 17 Drawing Sheets

(56) References Cited

U.S. PATENT DOCUMENTS

| | | | | |
|---|---|---|---|---|
| 8,994,591 | B2* | 3/2015 | Dupray | H04W 64/00 |
| | | | | 342/465 |
| 9,237,543 | B2* | 1/2016 | Karr | G01S 1/026 |
| 9,629,118 | B2* | 4/2017 | Rhoads | H04W 64/003 |
| 9,860,276 | B2* | 1/2018 | Crane | H04L 67/10 |
| 10,107,975 | B1* | 10/2018 | Lam | G02B 6/4206 |
| 10,701,038 | B2* | 6/2020 | Scott | H04L 63/0428 |
| 11,218,305 | B2* | 1/2022 | Zhang | H04L 9/3247 |
| 11,343,243 | B2* | 5/2022 | Iyer | H04L 9/0637 |
| 11,392,947 | B1* | 7/2022 | Prasad | G06Q 20/363 |
| 11,398,914 | B2* | 7/2022 | Wei | H04L 63/101 |
| 11,403,628 | B2* | 8/2022 | Soundararajan | H04L 9/30 |
| 11,449,476 | B2* | 9/2022 | Oberhofer | G06F 16/254 |
| 11,457,066 | B2* | 9/2022 | Chakraborty | H04L 63/20 |
| 11,520,773 | B2* | 12/2022 | Iwama | G06F 16/955 |
| 11,646,892 | B2* | 5/2023 | Bogineni | H04L 63/12 |
| | | | | 713/156 |
| 11,658,824 | B2* | 5/2023 | Shrinivasan | H04L 9/0861 |
| | | | | 713/164 |
| 11,665,005 | B2* | 5/2023 | Handa | H04L 9/3239 |
| | | | | 713/176 |
| 11,683,360 | B2* | 6/2023 | Kalva | G06F 16/908 |
| | | | | 709/203 |
| 11,734,712 | B2* | 8/2023 | Shim | G06Q 30/0246 |
| | | | | 705/14.45 |
| 11,943,362 | B2* | 3/2024 | Song | H04L 9/3218 |
| 11,949,802 | B1* | 4/2024 | Kim | H04L 9/50 |
| 11,960,613 | B2* | 4/2024 | Baldi | G06F 21/64 |
| 2019/0253434 | A1* | 8/2019 | Biyani | H04L 9/3297 |
| 2019/0319861 | A1* | 10/2019 | Pan | H04L 41/5019 |
| 2019/0372834 | A1* | 12/2019 | Patil | H04W 8/04 |
| 2020/0026785 | A1* | 1/2020 | Patangia | H04L 9/0643 |
| 2020/0045019 | A1* | 2/2020 | Huang | H04L 63/062 |
| 2020/0110740 | A1* | 4/2020 | Li | G06F 9/5077 |
| 2020/0110825 | A1* | 4/2020 | Iwama | G06F 16/2358 |
| 2020/0175331 | A1* | 6/2020 | Lahr | G06V 20/52 |
| 2020/0341951 | A1* | 10/2020 | Oberhofer | H04L 9/50 |
| 2021/0051023 | A1* | 2/2021 | Wei | H04L 9/3231 |
| 2021/0056141 | A1* | 2/2021 | Wojcik | H04L 9/3239 |
| 2021/0160233 | A1* | 5/2021 | Biyani | H04L 9/3236 |
| 2021/0185091 | A1* | 6/2021 | Cage | G06Q 20/3821 |
| 2021/0201318 | A1* | 7/2021 | Wylie | H04L 63/08 |
| 2021/0367791 | A1* | 11/2021 | Handa | G06Q 20/403 |
| 2022/0094560 | A1* | 3/2022 | Gaur | H04L 67/56 |
| 2022/0141025 | A1* | 5/2022 | Bogineni | H04L 9/3236 |
| | | | | 713/156 |
| 2022/0360833 | A1* | 11/2022 | Kannan | H04L 63/062 |
| 2023/0004537 | A1* | 1/2023 | Oberhofer | H04L 63/0428 |
| 2023/0360024 | A1* | 11/2023 | Burgis | G06Q 20/389 |
| 2023/0379367 | A1* | 11/2023 | Ratiner | H04L 63/20 |
| 2024/0137228 | A1* | 4/2024 | Davies | H04L 9/3247 |

FOREIGN PATENT DOCUMENTS

| | | |
|---|---|---|
| CN | 108833178 B | 8/2019 |
| CN | 107682331 B | 5/2020 |
| CN | 111683061 A | 9/2020 |
| EP | 3582439 A1 | 12/2019 |
| KR | 20190063537 A | 6/2019 |
| WO | 2019215040 A1 | 11/2019 |
| WO | 2021019429 A1 | 2/2021 |

* cited by examiner

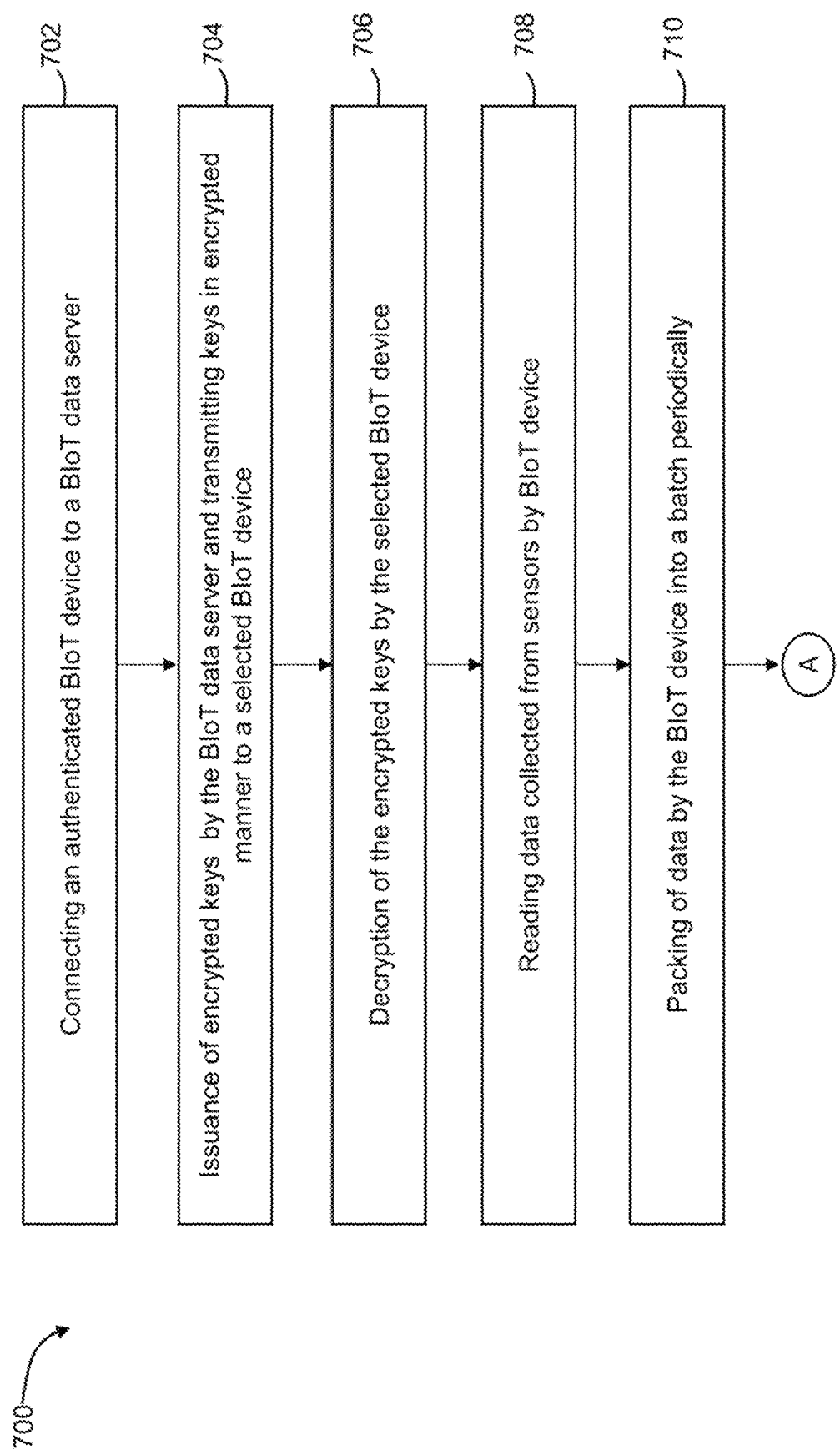

Figure 13

SYSTEM AND METHOD FOR BUILDING A TRUSTED NETWORK OF DEVICES

TECHNICAL FIELD

The following generally relates to security of computer devices and networks, and more particularly to blockchain-based device security and access control for internet of things (IoT) devices and networks using a multi-chain architecture.

INTRODUCTION

Blockchain network technology includes a connected, immutable, secure, and distributed ledger for keeping a record of transactions at each network terminal (i.e., node). Advanced Blockchains like Etherium contain not only a record of transactions but also computer programs and assets in a secure, encrypted form.

IoT (Internet of Things) technology comprises a network of connected computer devices collecting and sharing data in real time. The computer devices may include sensors, actuators, software, and physical computing equipment. The IoT devices may be configured to share and use data and computer resources to perform physical operations and provide services. The revolutionary features of IoT systems and the advantages of increased efficiency, predictive maintenance, digital interconnectivity, and scalability has enhanced deployment of IoT for personal and industrial use. Industries have slowly migrated their industrial control systems, manufacturing, operational systems to include IoT systems. IoT has been used to augment operations in sectors including healthcare, electricity generation, automobiles, industrial manufacturing, efficient transportation grids, and smart homes. IoT devices generate massive amounts of data and can help build dynamic supply chains based on inputs made through the IoT devices.

The distributed nature of IoT devices providing access to databases and industrial control systems has made IoT networks vulnerable to data breaches, hacking, and cyber-attacks. Hackers use IoT devices as entry points to gain unauthorized access to computer networks, extract organizational data and carry out cyber-attacks. As IoT devices have become more prolific, so have cyber-attacks that exploit their vulnerabilities. In recent times, these attacks have increased both in frequency and magnitude. The scalability of IoT systems, especially in industrial automation, manufacturing operations and data-based decision-making using sensors and actuators poses new cybersecurity threats. By breaching or gaining unauthorized access to a single device, hackers may control critical industrial systems to disrupt operations, extract valuable data and confidential information. Thus, security of IoT networks, particularly when deployed in critical infrastructure like power generation, national security networks, telecom communication system, defense, transportation, and stock markets need to be safeguarded.

Industrial control systems in various sectors have been attacked by hackers several times in the past decades. While cyber-attacks were generally hidden from the public, the shift to remote working setting for employees has brought forward cybersecurity risks. It is therefore crucial that suitable defensive practices and technological barriers be identified and implemented.

To combat this, disruptive technologies like blockchain can be used to protect the future of IoT-based infrastructure. Blockchain technology provides an ideal solution for the cybersecurity risks on IoT networks, since it eliminates the usual points of failure of traditional password and user ID driven VPN networks. Blockchain technology provides a decentralized, immutable mechanism for digital identities and sharing encrypted data which can be integrated with present-day IoT applications to create a safer, more secure BIoT (Blockchain Internet of Things) alternative.

Accordingly, there is a need for systems and methods to build a trusted network of devices with intrusion detection system (IDS) using blockchain IoT (BIoT) technology to provide advanced defensive solutions combined with intrusion monitoring and alert mechanisms embedded at the device level to counteract cyber-threats.

SUMMARY

A system for building a trusted network of devices is provided. The system includes a plurality of blockchain network channels. The plurality of blockchain network channels include an authentication blockchain channel, a data blockchain channel, a remote blockchain channel, and a security blockchain channel. The authentication blockchain channel is configured to: register a plurality of IoT devices by storing a unique identifier corresponding to the plurality of IoT devices; authenticate the plurality of IoT devices attempting to connect to the plurality of blockchain network channels by verifying the unique identifier of the plurality of IoT devices; and permitting the plurality of IoT devices access the plurality of blockchain network channels after successful authentication. The data blockchain channel is configured to: generate and store a cryptographic hash of every data set transacted on the plurality of blockchain network channels. The remote blockchain channel is configured to: store an organizational policy corresponding to a plurality of registered IoT devices, wherein the plurality of registered IoT devices include the plurality of IoT devices registered on the authentication blockchain channel; receive an operation request from the plurality of IoT devices; verifying whether the operation request is received from the plurality of registered IoT devices and the operation request is permitted by the organizational policy; and permitting the operation request on successful verification. The security blockchain channel is configured to: store a plurality of security log records of the plurality of IoT devices.

The system for building a trusted network of devices also includes a blockchain server platform. The blockchain server platform includes: an authentication server configured to decrypt a registration request and a data interaction request received from the plurality of IoT devices; a data server configured to decrypt an incoming data from the plurality of IoT devices and communicating the incoming to the plurality of blockchain network channels; a remote server configured to perform remote management operation by directly connecting a frontend device the plurality of IoT devices; and a security server configured to process the operation request for providing the device logs.

The system for building a trusted network of devices may further include a plurality of blockchain orderers configured to synchronize a plurality of nodes on the plurality of blockchain network channels.

The system for building a trusted network of devices may further include a plurality for certification authorities configured to: generating a plurality of digital certificates for the plurality of IoT devices; and validating the plurality of digital certificates for verifying the plurality of IoT devices.

The plurality of blockchain network channels may be developed on Hyperledger Fabric.

The unique identifier may include an unique device ID, a digital certificate, a digital signature, a TLS certificate or a key pair of a public key and a private key.

The operation request may be configured as a smart contract.

The operation request may further include analyzing device logs, an intrusion detection report wherein the intrusion detection report includes an event of unsuccessful authentication of the plurality of IoT devices, a list of the plurality of registered IoT devices, a system audit, feeding data into the plurality of blockchain network channels, activating a sensor connected to the plurality of IoT devices to feed data into the blockchain network channels, performing conditional statement or triggering a smart contract.

The organizational policy may include requirements for permitted operation request, data sharing protocols, encryption protocols for data storage and access, power allocation to the plurality of nodes, and permitted device operations.

A method for building a trusted network of device is provided. The method includes: enrolling an organization on a blockchain server platform; registering a plurality of IoT devices on the blockchain server platform by storing a wallet identity for each device on a plurality of blockchain network channels; authenticating the plurality of IoT devices using the wallet identity by receiving an endorsement by a plurality of peer nodes on the plurality of blockchain network channels; collecting on the blockchain server platform a device data received from a plurality of sensors on the plurality of IoT devices; encrypting the device data and simultaneously storing it on the plurality of blockchain network channels; updating the plurality of peer nodes with the updated version of the device data; and retrieving the device data upon receiving an operation request for a plurality of authenticated IoT devices.

The method may further include an authentication blockchain channel is configured to: register a plurality of IoT devices by storing a wallet identity corresponding to the plurality of IoT devices; authenticate the plurality of IoT devices attempting to connect to the plurality of blockchain network channels by verifying the wallet identity of the plurality of IoT devices; permitting the plurality of IoT devices access the plurality of blockchain network channels after successful authentication. The method may further include a data blockchain channel is configured to: generate and store a cryptographic hash of every data set transacted on the plurality of blockchain network channels. The method may further include a remote blockchain channel is configured to: store an organizational policy corresponding to a plurality of registered IoT devices, wherein the plurality of registered IoT devices include the plurality of IoT devices registered on the authentication blockchain channel; receive an operation request from the plurality of IoT devices; verifying whether the operation request is received from the plurality of registered IoT devices and the operation request is permitted by the organizational policy; permitting the operation request on successful verification. The method may further include a security blockchain channel is configured to store a plurality of security log records of the plurality of IoT devices.

The method may further include synchronizing the plurality of peer nodes using a plurality of blockchain orderers.

The wallet identity may include an unique device ID, a digital certificate, a digital signature, a chain of TLS certificates or a key pair of a public key and a private key.

The method may further include issuing a plurality of random session token after successful authentication of the plurality of IoT devices, wherein the plurality of random session token includes a set of logical instructions to be performed based on the operation request received from the plurality of IoT devices.

The plurality of sensors may include a temperature sensor, a pressure sensor, a proximity sensor, an accelerometer and gyroscope sensor, an IR sensor, an optical sensor, an illumination sensor, a humidity sensor, a motion sensor, a sound sensor, a magnetic sensor, and an air quality sensor.

The operation request may include analyzing device logs, an intrusion detection report wherein the intrusion detection report includes an event of unsuccessful authentication of the plurality of IoT devices, a list of the plurality of registered IoT devices, a system audit, feeding data into the plurality of blockchain network channels, activating a sensor connected to the plurality of IoT devices to feed data into the blockchain network channels, performing conditional statement or triggering a smart contract.

A method for building a trusted network of device is provided. The method includes: performing an operation at a frontend device and sending operation request to a blockchain server platform and a plurality of blockchain network channels; validating the access permissions of the frontend device and the operation request according to an organizational policy and a wallet identity of the frontend device; sending operation request to a plurality of IoT device in encrypted format on successful validation; decryption of the operation request by the plurality of IoT device and execution of the operation request by the plurality of IoT device; sending an operation result to the blockchain server platform and the plurality of blockchain channel; and storing a record of the operation result to the plurality of blockchain network channels.

The method may further include an authentication blockchain channel is configured to: register a plurality of IoT devices by storing a wallet identity corresponding to the plurality of IoT devices; authenticate the plurality of IoT devices attempting to connect to the plurality of blockchain network channels by verifying the wallet identity of the plurality of IoT devices; and permitting the plurality of IoT devices access the plurality of blockchain network channels after successful authentication. The method may further include a data blockchain channel is configured to generate and store a cryptographic hash of every data set transacted on the plurality of blockchain network channels. The method may further include a remote blockchain channel is configured to: store an organizational policy corresponding to a plurality of registered IoT devices, wherein the plurality of registered IoT devices include the plurality of IoT devices registered on the authentication blockchain channel; receive an operation request from the plurality of IoT devices; verifying whether the operation request is received from the plurality of registered IoT devices and the operation request is permitted by the organizational policy; and permitting the operation request on successful verification. The method may further include a security blockchain channel is configured to store a plurality of security log records of the plurality of IoT devices.

The wallet identity includes an unique device ID, a digital certificate, a digital signature, a chain of TLS certificates or a key pair of a public key and a private key. The method may further include issuing a plurality of encryption keys from the blockchain server platform; transmitting the plurality of encryption keys the plurality of IoT devices; and renewing the encryption keys on execution of the operation request by the plurality of IoT devices.

BRIEF DESCRIPTION OF THE DRAWINGS

FIGS. 7A and 7B is a flow diagram of a method of data management, secure communication of data from BIoT device and storing a record of transaction on the blockchain connected to the BIoT server platform, according to an embodiment.

FIG. 13 illustrates a screen capture 1300 of an example of a user interface providing security analysis and intrusion detection services on data transactions conducted by a device, according to an embodiment.

DETAILED DESCRIPTION

Figure 1:
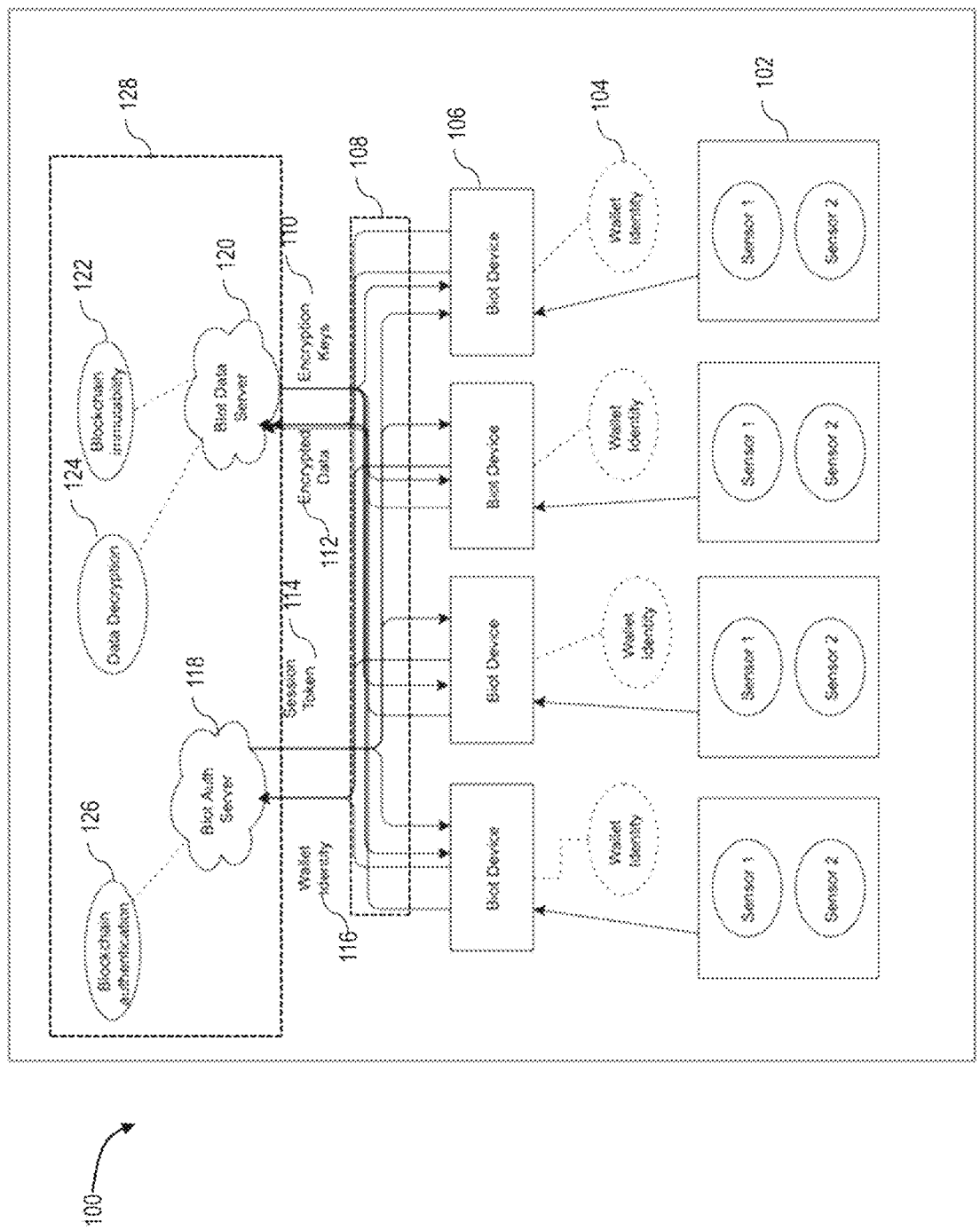
FIG. 1 is a schematic diagram of a system for building an intrusion detection system (IDS) using blockchain IoT (BIoT) technology, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, tablet device, IoT (internet of things) devices like sensors, actuators, industrial automated equipment, or connected electronic systems.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The systems and methods described herein generally relates to security of computer devices and networks, and more particularly to blockchain-based device security and access control for internet of things (IoT) devices and networks using multi-chain architecture.

References here in to blockchain means a secure, decentralized, immutable, distributed leger mechanism for verifying digital identities and sharing encrypted data. The blockchain described herein includes a ledger or record of transactions, data entry and access requests stored over a network of computer devices called nodes, referred to collectively as a peer network, wherein copies of an authentic version of the ledger is stored at each node on the peer network. The peer network may employ consensus building protocols to determine the authenticity of the ledger.

Immutability as used herein, refers to linking nodes together and storing copies of the same version of the ledger on each node to prevent data tampering. Blockchain IoT (BIoT) technology described herein refers to the integration of IoT and blockchain technologies, wherein the IoT devices are connected to a blockchain network. The IoT devices are authenticated and verified according to the protocols set by the blockchain network. Further, the IoT devices communicate securely over a blockchain network using cryptographic technology.

References herein to IoT (Internet of Things) devices means electronic devices connected to a network capable of data input/output, or processing or communication, including, but not limited to, actuators, sensors, PLC (programmable logic controller), industrial control systems, trackers, appliances, laptops, servers, cloud instances, and cloud networks. The IoT device may be connected to a variety of networks, including, but not limited to, an organizational private network, or the internet, or a local area network, or a Virtual Private Network (VPN) or a combination of the networks. The IoT device may be connected using a variety of communication methods, including; but not limited to, Radio Frequency Identification (RFID), Cellular (3G/4G/5G), Wi-Fi, Bluetooth, Bluetooth Low Energy (BLE), mesh protocols such as Zigbee, Z-Wave, Low Power Wide Area Networks (LPWANs).

References herein to BIoT (Blockchain Internet of Things) devices means an IoT device connected to the blockchain network described in the present disclosure. Further, a BIoT device may refer to an IoT device authenticated on any of the blockchain channels described in the present disclosure. A front-end device, IoT device referred in the following embodiments may refer to the BIoT device except when separately defined.

IoT devices and networks built for industrial systems or personal use can put valuable data at risk and disrupt normal operations. Certain IoT devices operating on low power networks may not have proper cybersecurity and data protection safeguards in place. Blockchain technology offers an optimal solution to address the cybersecurity concerns of IoT networks. The decentralized, secure, trusted, transparent and immutable features of blockchain technology can be leveraged in IoT systems to encrypt data communications, validate access at entry points, authenticate instructions and data inputs.

Interoperating with blockchain technology can address the security vulnerabilities of IoT networks. IoT devices on a network may be validated and permissions may be granted based on blockchain protocols set by an organization. Limited permissions may be granted to nodes susceptible to unauthorized access and data can be verified before storing the data in an organizational database. Communication and data exchange between IoT devices may be cryptographically encoded. Advanced consensus building algorithms may be used to identify suspicious devices or unauthorized activity to automatically reject access to such devices.

The systems and methods in the present disclosure include forming a decentralized trusted network of devices that provide end to end encrypted, secure, immutable, and auditable data streaming with remote end point management and intrusion detection in real time. The intrusion detection functions in the present systems and methods are stored on servers configured to apply artificial intelligence to audit, and detect anomalies to prevent cyber-attacks. The intrusion detection functions may include monitoring inbound or outbound network or device traffic, data access, remote management, device registration, or monitoring other functions offered by the system and methods in the present disclosure for a suspicious activity including unauthorized access, or violation of any organizational policy, or data protection/cybersecurity standards such as GDPR, NIST 800-53, GPG13, TSC SOC2, and HIPAA. The intrusion detection system in the present disclosure may include generation of alerts when a suspicious activity is detected and keeping a log information of a suspicious activity. The intrusion detection system in the present disclosure supported by the immutability offered by various blockchain channels may be advantageous in taking actions and prevention of suspicious activity including preventing registration of a device, blocking data traffic sent and requested from the suspicious device, and blocking remote management instructions. The intrusion detection system of the present disclosure may be network-based or host device-based.

The functions of an intrusion detection in the present disclosure may be achieved by storing intrusion detection rules on the servers including the BIoT Authentication Server or a BIoT Data Server. The intrusion detection rules may include a baseline to determine a normal behavior of devices including data access, remote management instructions, bandwidth, data protection standards, protocols, ports and other devices. The intrusion detection rules may include an organization's data storage and access policy. The suspicious activity may include detecting an anomaly or deviation from the intrusion detection rules stored on the server. On detecting any suspicious activity in violation of the intrusion detection rules, the system in the present disclosure may raise an alert and block the suspicious device. The system may record the signature database, device identification, transaction logs of the suspicious device. A person skilled in the art would be aware of the implementational details of the intrusion detection system including the placement of intrusion detection system, storing the intrusion detection system rules on the server, capturing network traffic, triggering and blocking mechanisms, presenting notifications, logs and receiving instructions from a system administrator. In a preferred embodiment, the intrusion detection system may be placed to optimally monitor traffic at device interfaces within or external to the organization such as at firewalls or endhosts or IoT device's operating system. Further, a plurality of intrusion detection systems may be placed over the network at different vantage points.

The systems and methods described herein provide a multi-chain architecture based on Hyperledger Fabric that ensures low latency peer-to-peer authentication and data streaming. The systems and methods of the present disclosure may be deployed on an IoT network used by an organization. On successful consensus in the organization on endorsing peers and setting communication and data sharing protocols, the present disclosure provides systems and methods wherein a new device may be authenticated and receive a trusted status to stream data from the device to pre-authenticated designated servers on the Organization's blockchain based IoT network. To ensure security and validity of data streamed by the IoT devices, time stamped hashes are created for every data point from a trusted device and every hash is stored in the distributed, immutable ledger for auditing and verification, if required.

The present systems and methods include a protocol that provides a comprehensive protective, proactive and predictive solution to fend off cyber-attacks on critical infrastructures including nuclear, power, defense, telecom, and banks.

The systems and methods described herein, provide a secure and decentralized alternative for MQTT (Message Queuing Telemetry Transport) and VPN (Virtual Private Networking) technology, and provides a private, secure distributed network of trusted devices with encrypted, immutable data streaming and device integrity with end point management, and intrusion detection. The present systems and methods may include setting protocols for allocating processing power to each node, thereby improving energy efficiency, and providing a light weight and environmentally friendly protocol which requires low processing power and very low RAM to run on edge (i.e., network entry point) devices. The present systems and methods described herein are compatible with at least Mac, Windows and Linux based operating systems.

The systems and methods described herein may advantageously provide for improved network security and privacy, detection and prevention of network anomalies by leveraging the immutability, transparency, distributed architecture, and encrypted communication offered by blockchain channels. The services offered by the systems and methods described herein may include providing data access and transaction logs of IoT devices connecting, attempting to connect and exchange data with a blockchain channel described herein. A plurality of blockchain channels may provide an immutable, encrypted record of transactions of IoT devices including access requests and data changes. This record of transactions stored on an immutable ledger may be used as transaction logs for data audits. The distributed ledger of the blockchain channel may advantageously provide a secure, reliable account to verify and match transaction logs and assist in data audits. The system and method described herein may be configured to store transaction logs to comply with data logging requirements under the industry standards such as HIPPA or GDPR. The transaction logs may include IoT device or user information as required by the industry standards such as ISO/IEC 27002. Generally, the transaction logs may include wallet identity information of the IoT device as described herein, session token, public keys, User ID, dates and times of data transaction, device location, sensor or front-end device ID, number of access attempts, files accessed by the IoT device, record of remote management instruction, port accessed, or external connections. The systems and methods described herein may be configured to dynamically retrieve the audit trail of data interactions recorded on the distributed ledger.

The systems and methods described herein may include providing a user interface to present device security statistics including the compliance status to cybersecurity and data protection standards, active users, common actions performed, recent files added, modified and deleted, timestamp of events, identifier and location of files modified, data and time of modification, information of the user performing file modification, permissions granted to the user, and size of file. The user interface may also provide integrity monitoring functions including frequency of events, date and time of events, description of event, rule level, rule ID, top requirements under a rule, rule level distribution, and top rule groups.

The systems and methods described herein provides an intrusion detection system supported by the plurality of blockchain channels for identifying data security incidents. The services include analyzing the frequency, source and character of the data intrusions attempts, and identifying system vulnerabilities. The data assets are stored on the plurality of blockchain channels to provide an immutable record of transactions. Additionally, the system may be used for providing regulatory compliance and meeting data security regulations. Further, the system may be used for triggering security responses in event of a suspicious activity thereby preventing data breaches and violation of security protocols. The combination of the intrusion detection system with blockchain based data storage and security improves efficiency and accuracy of threat detection and prevention, increases detection rates, with a reduced consumption of resources including storage and energy.

Referring to FIG. 1, illustrated therein, is a block diagram illustrating a system 100 for building a trusted network of devices with intrusion detection system (IDS) using blockchain IoT (BIoT) technology, in accordance with an embodiment. The system 100 provides security and access control for IoT devices and networks. Generally, an IoT device includes electronic devices capable on data input/output, processing and communication, including actuators, sensors, appliances, robotic equipment, assemble line operators, security system components, smart devices, industrial control systems and cloud networks. The IoT device may be used in an industrial setting or for personal use by a consumer.

The system 100 includes at least one BIoT device 106 connected to a BIoT server platform 128. The BIoT device described herein may include at least one computing device, including a laptop computer, a desktop computer, a server platform, a smart device, or the like, capable of data input/output and/or storing, processing or executing instructions, and connected to the BIoT server platform.

The BIoT device may be a piece of industrial equipment or a smart device for personal use by a consumer. The BIoT device may itself include other BIoT devices and may establish a communicative connection to other BIoT devices by a wireless connection via a network or by a wired connection.

The BIoT device may be powered by an operating system such as Mac, Windows, Linux, or the like.

Examples of the BIoT device are illustrated therein as 106 connected to the BIoT server platform 128. In various embodiments, the BIoT device may establish a communicative connection to the BIoT server platform by a wired connection or by a wireless connection via a network 108.

The BIoT device may include at least one sensor 102. The BIoT device 106 may establish a communicative connection to the sensor by a wireless connection via a network or by a wired connection, according to various embodiments.

The sensor 102 may be a device for detecting external stimuli/information and communicating the external stimuli/information in the form of a signal to the BIoT device 106. The sensor 102 may be used in augmenting and scaling the capabilities of the BIoT device. The sensor 102 may include at least one of a temperature sensor, a pressure sensor, a proximity sensor, an accelerometer, a gyroscope, an IR sensor, an optical sensor, an illumination sensor, a humidity sensor, a motion sensor, a microphone, a magnetic sensor, an air quality sensor, or the like.

The BIoT devices 106 and sensors 102 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network. Input device may include any device for entering information into BIoT device 106 or sensor 102. For example, input device may be a keyboard, key pad, cursor-control device, touch-screen, sensor receptor, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, BIoT device and sensor may include multiple of any one or more of processors, applications, software modules, second storage devices, network connections, input devices, output devices, and display devices.

The BIoT devices 106 and sensors 102 described herein represent various embodiments of an IoT device connected to a blockchain network for IoT device authentication and secure data communication. That is, a single BIoT device may receive signals from a sensor array on the BIoT device or a sensor communicatively connected to the BIoT device. The BIoT devices are also connected to the BIoT server platform 128 where the BIoT device is authenticated, and secure communication is established. The sensor may detect a variety of environmental data including motion, sounds, illumination, weight or pressure.

The BIoT device 106 may be connected with other BIoT devices and establish secure data sharing and control by communicating over a secure BIoT server platform. For example, the BIoT device may be an actuator or industrial control equipment operating on a manufacturing or assembly line in an industry. The BIoT device may be connected to other BIoT devices operating on the same assembly line but handling distinct segments of the manufacturing or assembling operations. In all embodiments, at least one BIoT device is communicatively connected to a sensor or an actuator, and after receiving authentication from the BIoT server platform, perform secure operations including access control and secure data exchange.

The BIoT server platform 128, BIoT devices 106, sensors 102, and nodes on a plurality of blockchains may be a server computer, desktop computer, notebook computer, tablet, PDA, smartphone, or another computing device. The BIoT devices and sensors may include a connection with the network such as a wired or wireless connection to the Internet. In some cases, the network may include other types of computer or telecommunication networks.

Although BIoT devices and sensors are described with various components, one skilled in the art will appreciate that the BIoT devices and sensors may in some cases contain fewer, additional or different components. In addition, although aspects of an implementation of the BIoT devices and sensors may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the BIoT devices and sensors and/or processor to perform a particular method.

In the description that follows, devices such as BIoT server platform 128, sensor 102, BIoT devices 106, and blockchain channels 126 are described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, it is described below that the BIoT devices 106 and sensors 102 may send information to the BIoT server platform 128. For example, a user using the BIoT device 106 may manipulate one or more input devices (e.g., a mouse and a keyboard) to interact with a user interface of the BIoT device 106 to enter certain input instructions. Generally, the BIoT device 106 may receive a user interface from the network (e.g., in the form of a webpage). Alternatively, or in addition, a user interface may be stored locally at a device (e.g., a cache of a webpage or a mobile application).

BIoT server platform 128 may be configured to receive a plurality of information, from each of the plurality of sensors 102, the plurality of BIoT devices 106, and the plurality of blockchain channels 126. Generally, the information may comprise at least a stream of data captured by the sensor, authentication information of the BIoT device or the user, organizational data stored on the blockchain ledger in one of the plurality of blockchain channels. For example, the authentication information may comprise one or more of a username, e-mail address, password, device UUID/UDID, digital signature, digital wallet, TLS certificate, employee ID or the like.

In response to receiving information, the BIoT server platform 128 may store the information in a storage database. Generally, the BIoT server platform stores the encrypted data on the plurality of block chain ledgers. For example, the IoT server may store encrypted data on a authentication blockchain channel 126 to provide services including blockchain immutability 122. The block chain channels may additionally augment external storage databases to store the encrypted data. In some cases, the storage database may comprise one or more storage devices located at a networked cloud storage provider.

The system 100 includes a BIoT server platform 128 which communicates with a plurality of sensors 102, a plurality of BIoT devices 106, and a plurality of blockchain channels 126 via a network 128. The BIoT server platform 128 may be a purpose-built machine designed specifically for receiving and communicating encrypted data in real time from the BIoT devices, sensors, and processing and authenticating the data. The BIoT server platform may be configured to be communicatively connected to a plurality of blockchains including authentication channel, data channel, remote channel and a security channel. The BIoT server platform may be configured to simultaneously communicate with a plurality of blockchains and securely transfer data.

The BIoT server platform may include BIoT Authentication Server 118. The BIoT Authentication Server may be communicatively connected to the BIoT device 106 and perform BIoT device authentication operations. Encrypted data 112 may be transmitted from the BIoT device 106 to the BIoT server platform 128. The BIoT device 106 may be issues a cryptographic chain of TLS certificates by the BIoT server platform 128. The cryptographic chain of TLS certificated may be stored in a wallet identity 116 of the BIoT device 106. The BIoT device 106 may connect with the BIoT Authentication Server 118 using the wallet identity 116. The BIoT Authentication Server 118 may validate the wallet identity 116 of the BIoT device 106 using the registration information stored on the authentication blockchain channel 126. The authentication blockchain channel 126 may be a distributed blockchain ledger to store the information of BIoT devices registered as described herein. For example, the BIoT Authentication Server 118 may check the UUID of the BIoT device 106 attempting to access data stored on organizational data stored on the blockchain, with the UUID of the registered devices stored on the authentication blockchain channel 126. The organization is given access to the same ledger which is read from the device during the first-time device activation. On successful authentication, the BIoT device may be issued a random session token 114 at every data transaction. The random session token 114 is automatically renewed before expiry if the BIoT device subscription is valid. The random session token 114 may expire after every data transaction.

The BIoT device 106 may be associated with an organization's account. Similarly, the BIoT administrator device may be associated with an administrator account, and the BIoT user device may be associated with a user account. Any suitable mechanism for associating a device with an account is expressly contemplated. In some cases, a device may be associated with an account by sending credentials (e.g., a digital signature, UUID/UDID or password etc.) to the BIoT server platform 128. The BIoT server platform 128 may verify the credentials (e.g., determine that the device credentials or the received password matches a password associated with the account). If a BIoT device 106 is associated with an account or on authentication, the BIoT server platform 128 may consider further acts by that device to be associated with that account.

Figure 2:
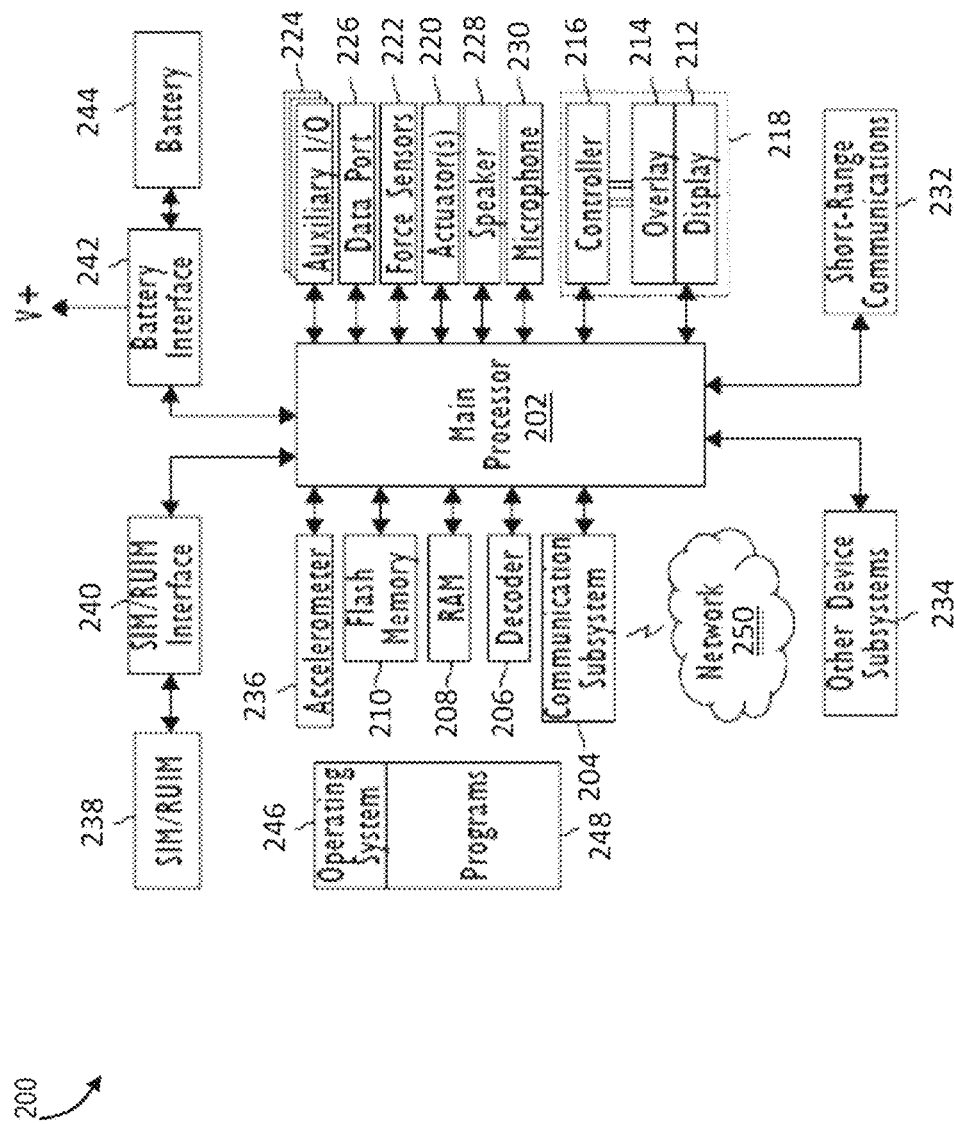
FIG. 2 is a block diagram of an IoT device, according to an embodiment.

FIG. 2 shows a simplified block diagram of components of a device 200, such as a mobile device or a portable electronic device or an IoT device or a front-end device. The device 200 may be for example any of the devices of FIG. 1. The device 200 includes multiple components such as a processor 202 that controls the operations of the device 200. Communication functions, including data communications, voice communications, or both may be performed through a communication subsystem 204. Data received by the device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 1360 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the device 200 may be similar. The speaker 228 may output audible information converted from electrical signals, and the microphone 230 may convert audible information into electrical signals for processing.

Figure 3:
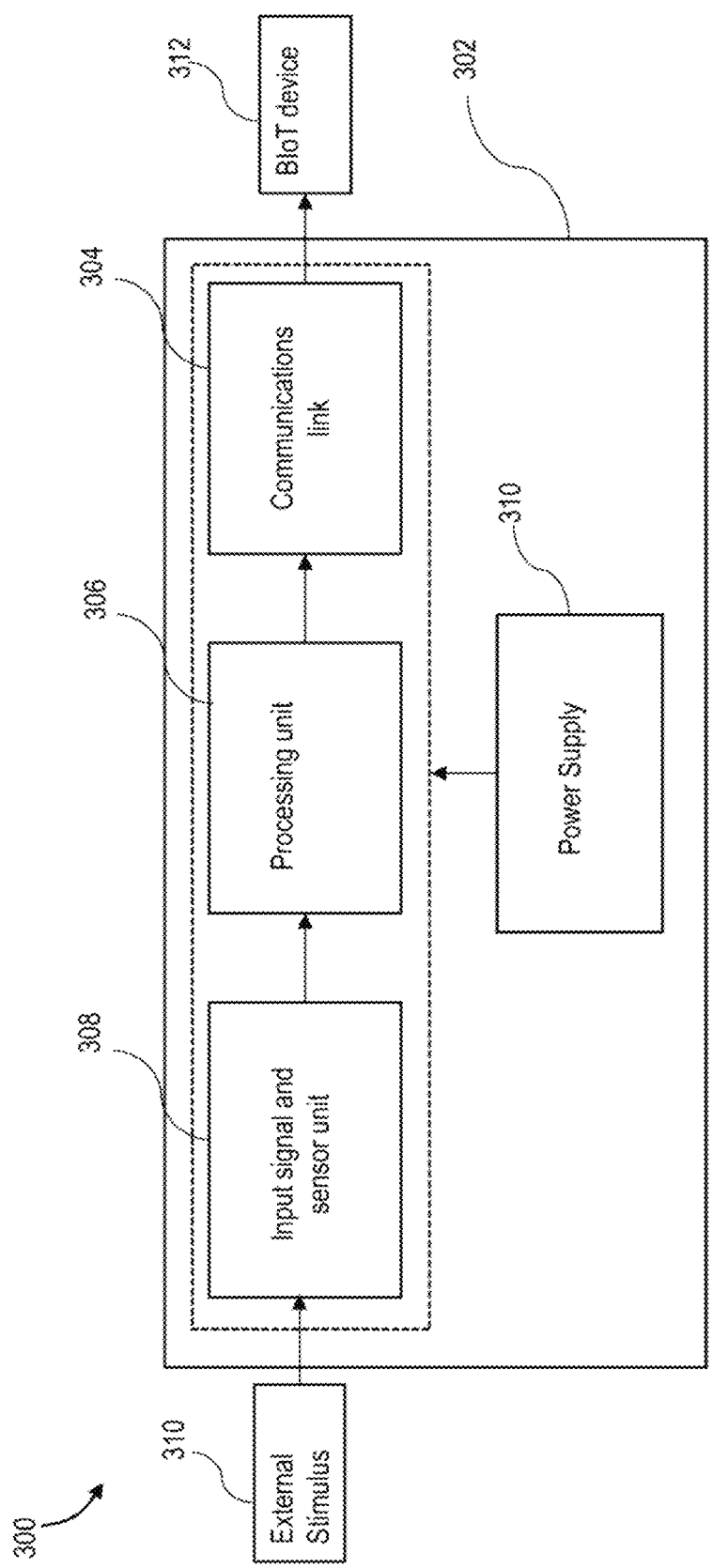
FIG. 3 is a block diagram of a sensor, according to an embodiment.

FIG. 3 shows a simplified block diagram of components of a sensor 300, such as a pressure sensor or a temperature sensor.

The sensor 300 may be receive data from an external stimulus 310 such as water, pressure or heat. The sensor is further communicatively to a BIoT device 312 to send the sensor data to the BIoT device 312. The BIoT device 312 may the BIoT device 106 of FIG. 1.

According to an embodiment, the sensor 300 may be embedded on the BIoT device 312. BIoT Device activates once the power supply 310 is switched on. The power supply 310 may provide an electrical power of 9 volts. On receiving power, an input signal and sensor unit 308 is activated. The input signal and sensor unit 308 is communicatively connected in the sensor 300 using Input/Output ports, which ensures that all the data is collected using hardwire/local network. A processing unit 306 is used to collect data from the input signal and sensor unit 308 and convert it into communicable, encrypted data using the BIoT protocol stored on the Communications Link 304. The encryption of data ensures that all the sensor data is completely encrypted using cryptographic signatures. A cryptographic hash is created for each data point which is streamed from the BIoT device with an embedded sensor. The encrypted data points can only be decrypted by a decryption server either hosted at local network or cloud.

Figure 4A:
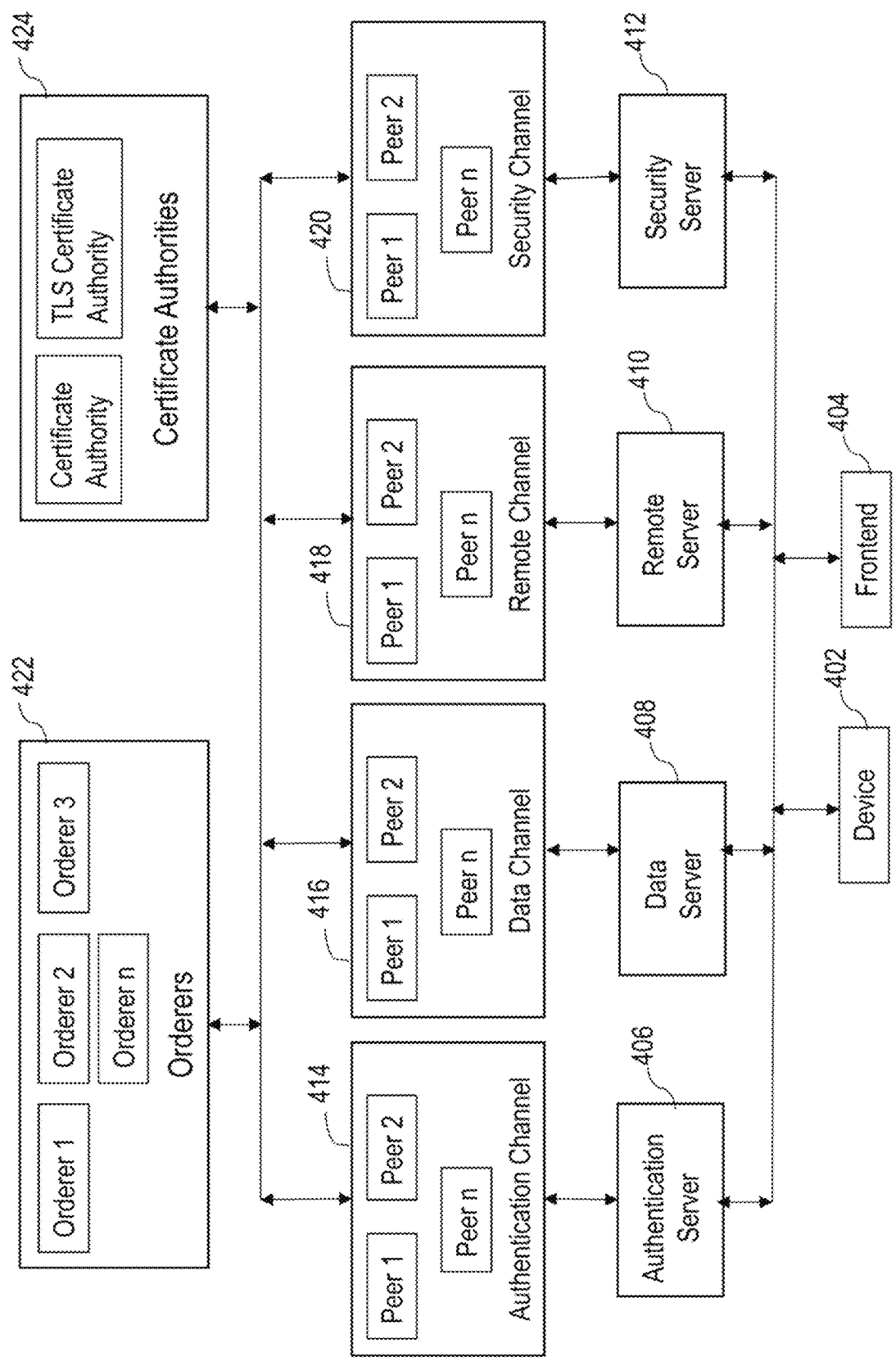
FIG. 4A is a schematic diagram of the architecture of the system of FIG. 1 for building a trusted network of devices with intrusion detection system (IDS) using blockchain IoT (BIoT) technology, according to an embodiment.

FIG. 4A, illustrated therein, is a schematic diagram of the architecture of the system 100 of FIG. 1 for building a trusted network of devices with intrusion detection system (IDS) using blockchain IoT (BIoT) technology, according to an embodiment.

The BIoT server platform includes an Authentication Server 406, a Data Server 408, a Remote Server 410, and Security Server 412.

The Authentication Server 406 is configured to receive a request to connect from a device 402 or a frontend 404. The Authentication Server 406 extracts the wallet identity from the device 402 or the frontend 404 and verifies the wallet identity from the registration record stored on the blockchain channels.

The Data Server 408 is configured to decrypt incoming data from the device 402 or the frontend 404 and transmit it for analytical purposes to other microservices.

The Remote Server 418 is configured for remote management operations. The Remote Server 418 connects directly to frontend 404 and the device 402 and ensures the operational instructions are executed at the maximum speed.

The Security Server 412 is configured to perform intrusion detection, integrity monitoring, system auditing, threat detection and response. The Security Server 412 constantly analyzes the regulatory compliance ratings of the device 402, thus providing real time security analysis of the device 402 to a system administrator.

The Authentication Blockchain Channel Peers 414 represents a blockchain network including a plurality of peers carrying the transaction records. The Authentication Blockchain Channel 414 is configured to authenticate the device 402 identity when the device connects with the BIoT servers for availing different services.

The Data Blockchain Channel Peers 416 represents a blockchain network including a plurality of peers carrying the transaction records. The Data Blockchain Channel 414 is configured to maintains the hash entry of every data stored on the blockchain network for future verification.

The Remote Blockchain Channel Peers 418 represents a blockchain network including a plurality of peers carrying the transaction records. The Remote Blockchain Channel 414 is configured to verify the operation and operator at the front end 404 is permitted based on the organization policies set on the blockchain network.

The blockchain orderers 422 are implemented in a Hyperledger fabric wherein the orderers 422 synchronize the ledger across the blockchain network. The orderers 422 package transactions into blocks and distributes the transactions to anchor peers on a blockchain network.

The certificate authority 424 is configured to grant digital certificates or TLS certificates for registering and authenticating the device 402 or the frontend 404 on the blockchain network.

According to an embodiment, the device 402 may be configured as a BIoT embedded device or a BIoT enabled device. The device 402 may be an actuator or a robotic arm used in an industrial assembly line. The BIoT embedded device may include a pre-deployed BIoT peer which can be activated using a frontend device 404 either hosted on local network or cloud. Further, the device 402 may be authenticated using the device board ID, device log. Once the correct BIoT device board ID is entered on the front end 404, a curl command may be auto generated at the front end 404, which can be simply run on the BIoT enabled device 402. After running the curl command, the user may run a BIoT data command or a BIoT remote command on the terminal, which will authenticate the device based on the information provided at the frontend 404. If the device board ID of the device 402 matches with the information entered on the front end 404, then BIoT enabled device 402 will be endorsed by the BIoT endorsing peer hosted local or on the cloud on an Authentication Blockchain Channel 414. On successful authentication, the data received from the device 402 or sensors connected with device 402, will be encrypted and hash will be stored on the server hosted locally or on the cloud servers.

Figure 4B:
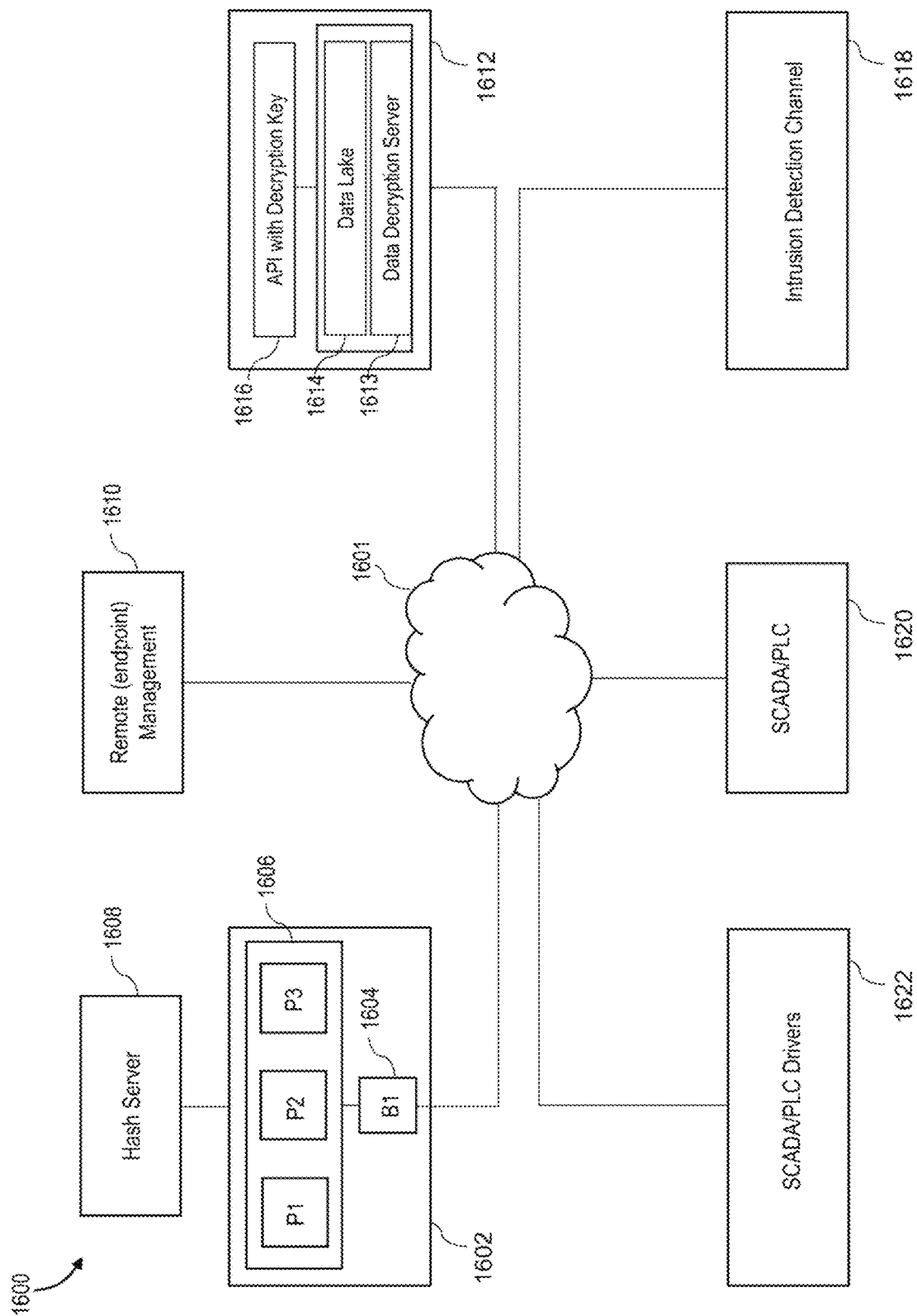
FIG. 4B is a schematic diagram of the architecture of the system of a system for building a trusted network of devices with intrusion detection system (IDS) using blockchain IoT (BIoT) technology, according to an embodiment.

FIG. 4B is a schematic diagram of the architecture of a system 1600 for building a trusted network of devices with intrusion detection system (IDS) using blockchain IoT (BIoT) technology, according to an embodiment.

The system 1600 includes a plurality of blockchain channels. The blockchain channel may refer to a distributed blockchain ledger. The blockchain channel may be further configured to connect to operational interfaces including an external data storage solution at each blockchain node or APIs to connect with IoT devices, front end devices. According to an embodiment, the plurality of blockchain channels include Authentication Blockchain Channel 1602, Endpoint Management Blockchain Channel 1610, Data Blockchain Channel 1612, and Intrusion Detection Blockchain Channel 1618.

In various embodiments, a blockchain channel in the plurality of blockchain channels may establish a communicative connection to each or any other blockchain channel in the plurality of blockchain channels via a network 1601. The network 1601 may comprise of wireless connection or wired connection. The wired network connection may include an ethernet cable. The wireless connection may include WiFi, LTE, 3G/4G/5G.

The plurality of blockchain channels may be connected to remote equipment or industrial controllers via the network 1601. One or more of the blockchain channels in the plurality of blockchain channels may be connected to SCADA/PLC 1620. One or more of the blockchain channels in the plurality of blockchain channels may be connected to SCADA/PLC Drivers 1622.

The SCADA/PLC 1620 may include a plurality of Programmable Logic Controllers (PLCs) connected to a Supervisory Control and Data Acquisition (SCADA) system. The programmable logic controller may comprise of hardware components including computer processors to manipulate manufacturing processes such as industrial assembly lines, robotic devices, sensors. The programmable logic controller may include an industrial microprocessor supported by a power supply, programmable memory, input/output interface to receive user instructions and provide feedback and communication components. The programmable logic controller may be communicatively connected to electronic devices including sensors and actuators. The programmable logic controller may be configured to receive data from sensors to monitor environmental data in an industrial setting. The programmable logic controller may collect environmental data from the embedded sensors and transmit the information to the plurality of blockchain channels or the BIoT server platform as described in FIG. 1. The programmable logic controller may be configured to execute instructions and control industrial equipment including actuators. The instructions may be transmitted by a user or automatically fed through a SCADA system or may be performed by a smart contract.

A SCADA system may include a combination of hardware and software components to integrate and provide instructions, supervisory operations to industrial control systems such as programmable logic controllers. The SCADA system may be configured to store and analyze data collected from the programmable logic controllers. The SCADA system may be configured to provide remote instructions to the programmable logic controllers. The SCADA system may comprise of a monitoring software and user interface.

The SCADA/PLC Drivers 1622 may refer to an interface deployed between the SCADA system and the programmable logic controller. Further, the SCADA/PLC Driver 1622 may refer to a timestamped or a time-series database to collect, store and process data from a SCADA system. The SCADA/PLC Drivers 1622 may be configured to store data logs for a plurality of programmable logic controllers including data attributes such as nature of data measured (e.g., temperature, humidity, pressure), value of the data, timestamp, and a data quality indicator. The data logs may be stored as binary files for efficient retrieval.

The Authentication Blockchain Channel 1602 may refer to a distributed blockchain ledger for authenticating BIoT devices. The plurality of blockchain channels may be implemented on a Hyperledger Fabric. The BIoT device or SCADA/PLC 1620 may be enrolled or registered on the Authentication Blockchain Channel 1602. The Authentication Blockchain Channel 1602 may include a plurality of peer nodes. According to an embodiment, the Authentication Blockchain Channel 1602 may include two types of peers: a BIoT peer 1604 and a plurality of endorsing peers 1606. The BIoT peer 1604 may be configured as an anchor peer. The BIoT peer 1604 may be communicatively connected and discoverable by all the other peers on the Authentication Blockchain Channel 1602. The BIoT peer 1604 may be configured to allow communication between all the other peers of the blockchain channel. The plurality of endorsing peers 1606 may be configured to verify a proposal to a transaction received from the BIoT peer 1604 and approve a transaction. On receiving an endorsement, the transaction may be submitted to the other peers in the Authentication Blockchain Channel 1602 to commit the transaction. The transaction may include enrolling a BIoT device on the Authentication Blockchain Channel 1602.

Additionally, the Authentication Blockchain Channel may include orderers as described in the present disclosure. The orderers may be configured to accept endorsed transaction and package them into a block before delivering the blocks to the peer nodes.

The Authentication Blockchain Channel 1602 may be communicatively connected to the hash server 1608. The hash server 1608 may be an externally augmented storage solution. The hash server 1608 may be used to store encrypted value of the authentication data or transactions occurring over the Authentication Blockchain Channel 1602. The data may be stored on the hash server 1608 in real-time or uploaded periodically. The hash server 1608 may be advantageous in storing a back up of the authentication data or transactions occurring over the Authentication Blockchain Channel 1602 in encrypted format.

According to an embodiment, a lightweight BIoT binary may be deployed on the SCADA/PLC 1620 for embedded security. The binary may include a collection of executable code, source files, configuration files, or shell scripts. The device for example, the programmable logic controller 1620 may be enrolled on the Authentication Blockchain Channel 1602 using a curl command as described in the method 500 of the present disclosure. The device may be authenticated by the distributed network of peers in the Authentication Blockchain Channel 1602. The authentication process may involve registering the device log and identification such as UDID and UUID. The enrolment status of the device may be shared with the plurality of blockchain channels. A record of authentication data may be stored as a backup on the Hash Server 1608 in the encrypted form. The record of authentication data may include device logs, identification information of the device such as UDID and UUID, and the wallet identity of the device.

The Remote (endpoint) Management Channel 1610 may refer to a distributed blockchain ledger for controlling operations on SCADA/PLC 1620 or BIoT devices connected to the plurality of blockchain channels.

According to an embodiment, on receiving an instruction from the front-end device, the Remote (endpoint) Management Channel 1610 may remotely terminate the operation of a plurality of components on the SCADA/PLC 1620 or BIoT devices connected to the Remote (endpoint) Management Channel 1610. The BIoT binary deployed on the BIoT device may be utilized to remotely manage the components or ports of the BIoT device. For example, ports on the SCADA/PLC 1620 or BIoT devices may be enabled/disabled remotely on receiving instructions from the Remote (endpoint) Management Channel 1610. The ports may include Bluetooth or USB or firewall ports. Additionally, the Remote (endpoint) Management Channel 1610 may remotely terminate any process or service performed by the SCADA/PLC 1620 or BIoT devices. Further, the system described herein may include a user interface to display device dashboard and device performance analytics. The device dashboard and device performance analytics may include information on the BIoT devices connected to the plurality of blockchain channels.

The Realtime Encrypted Data Streaming Blockchain Channel 1612 may refer to a distributed blockchain ledger for receiving and storing data stream from the SCADA/PLC 1620 or BIoT devices authenticated on the Authentication Blockchain Channel 1602. The Realtime Encrypted Data Streaming Blockchain Channel 1612 may be communicatively connected to the certificate authority and configured to authenticate the wallet identity of the device from the certificate authority.

According to an embodiment, the SCADA/PLC 1620 or BIoT device may be issued a digital certificate or a TLS certificate from a certification authority. The certification authority may generate a cryptographic chain of digital certificates or TLS certificates for the SCADA/PLC 1620 or BIoT device. The wallet identity of the SCADA/PLC 1620 or BIoT device may include the unique identifier of the device and the digital certificates or TLS certificates of the device. Data stream from the SCADA/PLC 1620 or BIoT device to the Realtime Encrypted Data Streaming Blockchain Channel 1612 is fully encrypted with the cryptographic chain of TLS certificates issued to the SCADA/PLC 1620 or BIoT device. Next, the data stream is decrypted by the cryptographic Data Decryption Server 1613. The Data Decryption Server 1613 may be communicatively connected to the APIs with Decryption Key 1616. The APIs with Decryption Key 1616 may refer to a database to specify decryption key to be used to decrypt the data stream.

The decrypted data is stored on the Data Lake server 1614. The Data Lake server 1614 includes a peer deployed to monitor intrusion detection and end point remote management of BIoT devices. Additionally, the data collected may be used for artificial intelligence and real-time data analytics.

The Intrusion Detection Blockchain Channel 1618 may refer to a distributed blockchain ledger for providing intrusion detection services on SCADA/PLC 1620 or BIoT devices connected to the plurality of blockchain channels. The intrusion detection services include Security Analytics, Intrusion Detection, Log Data Analysis, File Integrity Monitoring, Network Intrusion Detection (HIDS & NIDS), Vulnerability Detection, Incident Response, and Regulatory Compliance.

The systems and methods of the present disclosure provides a plurality of intrusion detection methods, including signature-based detection and anomaly-based detection.

To perform a signature-based detection, the suspicious data access patterns or suspicious remote instructions are stored as suspicious signatures on the server. Thereafter, network traffic is monitored and IoT devices performing data access requests or remote instructions similar to suspicious signatures may be triggered or blocked by the intrusion detection system.

To perform an anomaly-based detection, the wallet identity of the IoT device attempting data access requests or providing remote instructions is detected. If the wallet identity fails to match the list of authenticated IoT devices on the authentication blockchain channel, an anomaly is detected. Further, the data access patterns, and remote instructions provided by the IoT device is compared against an established baseline. The baseline may include organizational policies or industrial standards on data security. IoT device behavior in violation of the baseline may be identified as an anomaly.

The systems and methods of the present disclosure provides a plurality of intrusion detection methods, including signature-based detection and anomaly-based detection.

To perform a signature-based detection, the suspicious data access patterns or suspicious remote instructions are stored as suspicious signatures on the server. Thereafter, network traffic is monitored and IoT devices performing data access requests or remote instructions similar to suspicious signatures may be triggered or blocked by the intrusion detection system.

To perform an anomaly-based detection, the wallet identity of the IoT device attempting data access requests or providing remote instructions is detected. If the wallet identity fails to match the list of authenticated IoT devices on the authentication blockchain channel, an anomaly is detected. Further, the data access patterns, and remote instructions provided by the IoT device is compared against an established baseline. The baseline may include organizational policies or industrial standards on data security. IoT device behavior in violation of the baseline may be identified as an anomaly.

The intrusion detection rules require a minimal storage space and can be conveniently deployed or modified on the intrusion detection system. The rule-set may be configured to detect changes to the system files, log tampering, unauthorized remote instruction, system penetration, data access and manipulation. The rule-set may be provided by a system administrator on a user interface and stored on a server. The secure access to user interface and proper use of administrator privileges are ensured by the use of blockchain channels to store the intrusion detection system and encrypting the communication on the network described herein. The intrusion detection system may check the rule-set at each IoT device registration or data access request or remote management instruction for front-end devices or data access or modification. The intrusion detection system may be placed to monitor network traffic such that rule-sets may be verified at each data transaction. The system described herein may be configured to update the rule-sets using the administrator's user interface.

The system of the present disclosure may be configured to implement a smart contract-based intrusion detection system to automate rule verification of data transactions performed over the blockchain channels. The smart contract-based intrusion detection system may monitor network traffic including data transmitted from IoT devices and front-end devices. The intrusion detection rules may be embedded in the smart contract. The smart contract may include rules for IoT device registration, IoT device authentication, front-end or remote management. The smart contract may be configured to automatically trigger an intrusion prevention event on detection of the suspicious activity violating the rule-set.

On breach of a rule-set, an intrusion is detected and an alert is triggered by the server. The intrusion details may be displayed on the user interface. The intrusion details may include information for investigating the potential intrusion such as port information or location of intrusion, rule breach information, transaction log, pathname, data/attribute modification, update operations, suspicious access patterns, structural changes to content, previous content values, and operations performed. The system described herein may be configured to store a record of intrusions or intrusion attempts. The system may also store the common intrusion behavior. The immutable ledger of the blockchain channels may record traces of system penetration and data files tampered or accessed. The user interface may be accessed at the BIoT device terminal or front-end or the administrator terminal. The system may be configured to trigger events to prevent a potential intrusion.

The intrusion detection rules may be defined in separate categories depending upon the nature of the suspicious activity for example data modification, remote instruction, device authentication. The rule may specify the path of the data files to be monitored. The rule may include file attributes, list of permissible operations, authorized remote instructions, suspicious signatures or access patterns, or the organizational policy.

Rule-based intrusion detection system reduces the consumption of computer resources including storage, energy, and processing cycles. Additionally, the network traffic is monitored in real time and any violation of intrusion detection rules is swiftly detected to prevent unauthorized access. The intrusion detection rules stored on the server detects and prevents suspicious activity at network interface in events where the IoT device or the front-end device is compromised. The immutable blockchain ledger automatically stores a historical record of data files and transactions performed. This obviates the need for maintaining or storing a reference database. Further, attempts to manipulate audit logs and reversing timestamps are prevented for data stored on the blockchain channel.

Figure 5A:
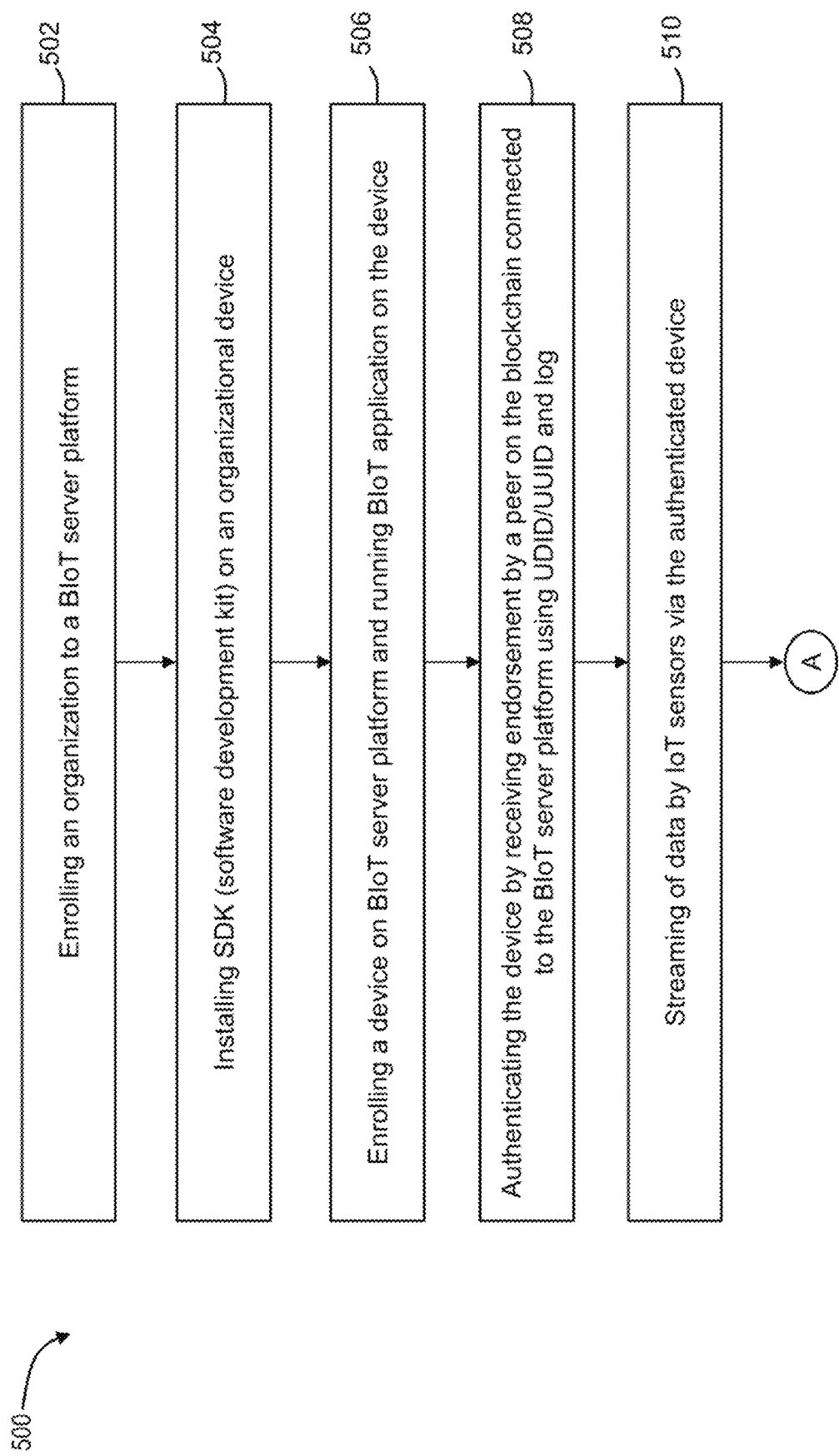
FIGS. 5A and 5B are a flow diagram of a method of enrolling and authenticating an organization and a device on a BIoT server platform, according to an embodiment.
Figure 5B:
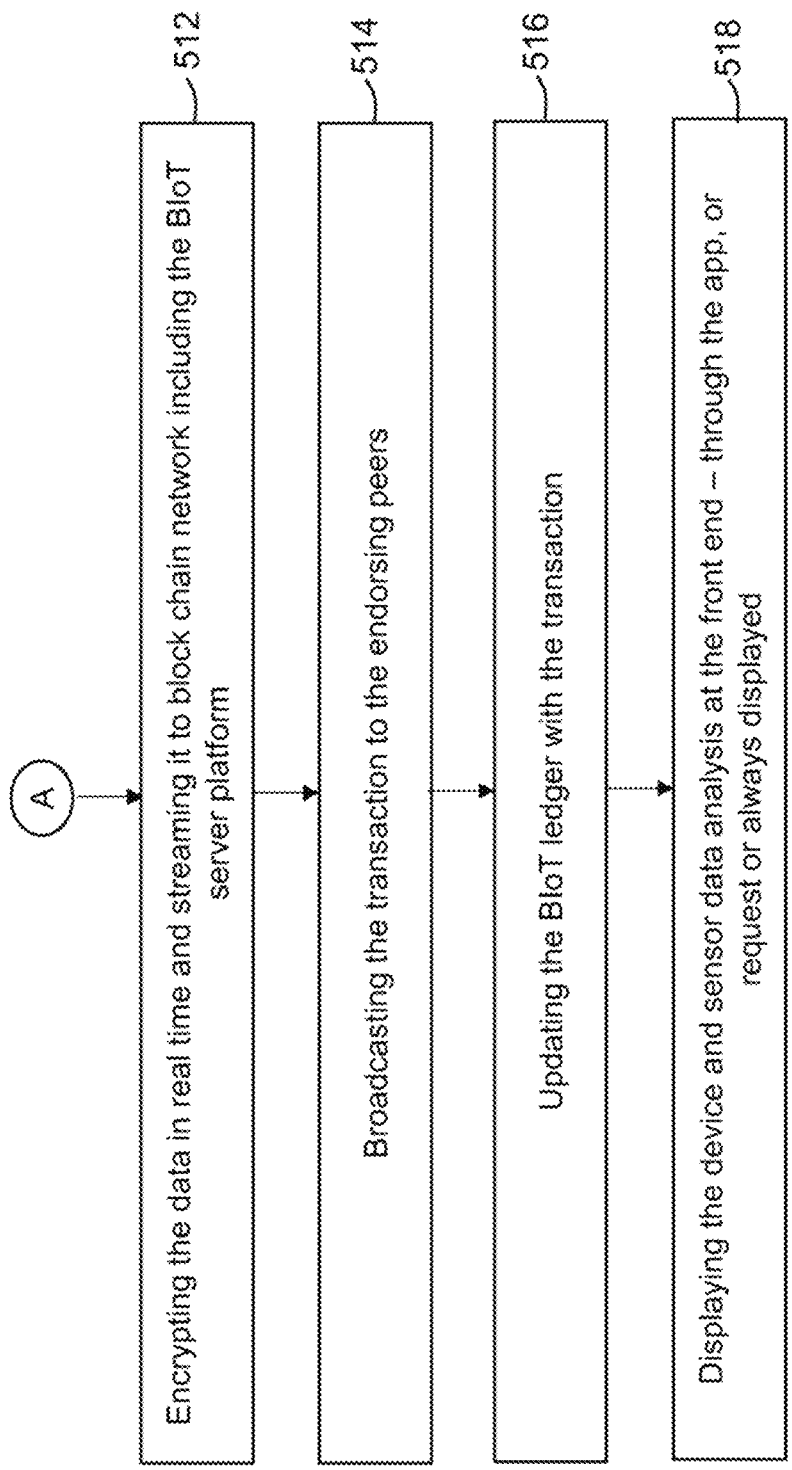

FIGS. 5A and 5B illustrate a flow diagram of a method 500 of enrolling and authenticating an organization and a device on the BIoT server platform, according to an embodiment. Method 500 represents a core, general method for enrolling an organization and registering devices on the BIoT server platform and establishing secure data communication and access control for internet of things (IoT) devices connected to a plurality of blockchain channels.

The method 500 refers to a single BIoT device, however, it is to be understood that the BIoT device may include multiple computing devices and various steps, or storage of data/information may occur on or be performed by one or more of the BIoT devices. Further, the BIoT server platform may be connected to multiple BIoT devices and various steps, or storage of data/information may occur on or be performed by one or more of the BIoT devices. Furthermore, the multiple BIoT devices may be communicatively connected to each other over the BIoT server platform and perform one or more steps in conjunction. The BIoT server platform may also be connected to front-end devices. The front-end device may be used to present instructions and receive feedback. For example, the front-end device may generate a curl command to be entered in the BIoT device for successful registration of the BIoT device.

Every transaction including enrolment of an organization, enrolment of a device, data stream received from the IoT devices or sensors, remote instruction, intrusion detection services described herein, may be recorded on the blockchain network, wherein the blockchain network includes the plurality of blockchain channels and any external data storage solution connected to any of the blockchain channel in the plurality of blockchain channels.

The steps of performing a transaction on the blockchain network described herein may be performed using a smart contract. The transaction may include recording an event on the blockchain network or performing an operation on the blockchain network. For example, the transaction on a blockchain may include registering a new device on a blockchain network or authenticating device identity when device attempts to connect to the blockchain network. A smart contract may refer to a set of rules or steps to perform a specific event on the blockchain. The smart contract may be configured to automatically perform certain operations on the blockchain network in response to an event. The event may include, for example, a request made by an authorized user to register a device on the blockchain network or generate integrity monitoring record of the organization's data assets stored on the blockchain network or performing an intrusion prevention operation on breach of intrusion detection rules stored on the server.

According to an embodiment, a multiple chain blockchain architecture is provided wherein the BIoT server platform may be communicatively connected to a plurality of blockchain channels. Each blockchain channel may be configured to record and store a specific set of transactions on the peer network of a data blockchain channel or perform specific operations. For example, an authentication blockchain channel may include a peer network for keeping a record of organizations enrolled and devices registered by the BIoT server platform. Further, the authentication blockchain channel may perform the function of authenticating device identity when the device attempts to connect with the BIoT server platform or request certain services.

It is to be understood that, herein, any reference made to a transaction being recorded on a blockchain network or specific operation performed by the blockchain network includes recording the transaction or performing the operation on specific blockchain channels.

Cryptographic techniques may be used to secure the data communicated between the devices, the BIoT server platform, and the blockchain channels. Further, transaction records stored on the blockchain channel, and the data processed by the BIoT server platform may be limited to the encrypted version of the data.

At 502, an organization is enrolled on the BIoT server platform. This step includes creating an account for the organization on the BIoT server platform to ensure authorized access to the organization on the plurality of blockchain channels. The BIoT server platform may be configured to register the organization and provide access credentials to the organization such as a digital signature, username, password, organization identifier or the like. Further, the BIoT server may store the organization's identification information and access credentials on authentication blockchain channel on successful enrolment of an organization. Enrolment of an organization would mean that only a user authorized by the organization or the device permitted by the organization may access the resources and services provided by the BIoT server platform and the plurality of blockchain channels. The BIoT server platform or the plurality of blockchain channels may be configured to store the organizational policies including communication policies, data storage policies, device management policies, and device operation policies. The organizational policy may include requirements for permitted device operations, encryption protocols for data storage and access. The organizational policies may be advantageous in verifying the validity of a data access request or operational instructions received from a BIoT device and improving security.

The BIoT server platform may be configured to create a plurality of accounts for an organization and establish customized access policies for each account. For example, an administrator account for an organization may be granted privileges to update organizational policies, whereas a user account for an organization may only be permitted to access specific datasets on the plurality of blockchain channels and perform a pre-authorized set of operations on BIoT devices. Further a plurality of user accounts may be created for an organization with customized data access and operational permissions for each user account.

The organization account may include a subscription plan selected by the organization. The subscription plan may include the services offered to the organization and a time period for providing the services. The BIoT server platform may be configured to periodically monitor the subscription status of the organization. The BIoT server platform may be configured to automatically stop services upon expiry of the subscription plan for the organization. For example, BIoT device authentication tokens for an organization may not be renewed or re-issued if the device subscription is invalid.

Step 502 includes storing a record of the enrolled organization, organizational accounts, organizational policies described herein on the plurality of blockchain channels by the BIoT server platform. For example, the authentication blockchain channel peers, as illustrated, may store the registration information of the organization. Records may be stored in encrypted form on the blockchain network to improve security.

Method 500 refers to a single organization, however, it is to be understood that multiple organizations can be enrolled or registered by the BIoT server platform and a record of organizations may be stored on the plurality of blockchain channels. Further, the organization referred herein may include any individual or a collective establishment availing services offered by the BIoT server platform and accessing the plurality of blockchain channels.

At 504, an SDK (software development kit) is installed on an organization device. The organization device may be a front-end device as described in the present disclosure. The SDK includes a set of software development tools and programs for developing and modifying applications for specific platforms. It is to be understood that, herein, any reference to an SDK is to include a set of tools for developing and modifying applications and programs to avail services offered by the BIoT server platform. For example, an organization may use the SDK to establish or update organizational policies on the BIoT server platform. Further, the SDK may be used to establish protocols for registering new devices for accessing the BIoT server platform, or authentication of the devices before allowing them access to the BIoT server platform, and removal of the devices registered on the BIoT server platform. For example, the SDK on the organization's front-end device may be used to receive the unique identification information of the BIoT device and generate a curl command. The curl command may thereafter be entered on the BIoT device to authenticate the BIoT device.

Furthermore, the SDK may be used to establish and modify operational policies of the organization on the BIoT server platform. The operational policies may include rule sets of permitted operations for any organizational device registered on the BIoT server platform. For example, the organizational device may be permitted to access only a specific segment of organizational data stored on the BIoT server platform.

The SDK may include libraries, documentation, code samples, guides, editors, program development environments, testing tools, drivers, network protocols, or any other tool necessary for creating applications for making use of the services on BIoT server platform. The structure, versions and updates to the SDK may be determined by the administrator of the BIoT server platform.

The SDK may be installed on more than one devices of an organization. It is to be understood that, herein, any references to a singular or plural devices or the constituent of the SDK is solely for illustrative purposes and that a singularity or plurality of any of the above may be present in various embodiments.

At 506, a new device is enrolled on the BIoT server platform and thereafter a BIoT application is run on the device. It is to be understood that, herein, any references to a BIoT device means the device associated with the organization and registered on the BIoT server platform. The BIoT device may be allowed to access the resources and services of the BIoT server platform and the connected blockchain networks.

The enrolment of the BIoT device may involve an authorized user from the organization enrolled on the BIoT server platform making a registration request to the BIoT server platform to register the BIoT device on the BIoT server platform. According to an embodiment, the registration request may include the device identifier such as UDID (Unique Device ID) or UUID (universally unique identifier). The device identifier may be a unique fixed-digit alphanumeric label assigned to the device by a manufacturer. Thereafter, the BIoT server platform may verify whether the registration request is received from the authorized user or the front-end device of the organization enrolled on the BIoT server platform. On confirmation, the BIoT server platform may record the new device registered and the unique identifier of the device on the blockchain network.

According to an embodiment, to perform the enrolment of a BIoT device an authorized user may present the device identifier information of the BIoT device to the front-end device. For example, the user may enter the UDID or UUID of the BIoT device to the front-end device. The front-end device 404 and the BIoT device 402 may be communicatively connected to the BIoT server platform and the plurality of blockchain channels as illustrated in FIG. 4. The BIoT server platform may include authentication server 406, data server 408, remote server 410, and security server 412 as illustrated in FIG. 4. The plurality of blockchain channels may include authentication blockchain channel 414, data blockchain channel 416, remote blockchain channel 418, and security blockchain channel 420 as illustrated in FIG. 4. Thereafter, the BIoT server platform and the authentication blockchain channel may verify whether the request has been received from a valid front-end device. This step may include verifying from the distributed ledger record that the front-end device comprises of the valid credentials as stored on the authentication blockchain channel. Further, the BIoT server platform or the plurality of blockchain channels may verify that BIoT device is consistent with the organizational device policy. For example, the BIoT server platform may be configured to identify the specifications of the BIoT device from the UDID or UUID of the BIoT device. If the UDID or UUID indicate that the BIoT device is an industrial robotic actuator, the organization's policy may be referred to confirm whether the industrial robotic actuator is to be permitted for enrolment. This step may include checking the consistency of the request on the plurality of blockchain channels. The organization's policy may be stored on the BIoT server platform or the plurality of blockchain channels. On successfully meeting the enrolment conditions, a curl command may be generated and displayed on the front-end device. The user may thereafter enter the curl command on the BIoT device. The BIoT device may communicate the curl command and the BIoT device enrolment request to the BIoT server platform or the plurality of blockchain channels. The curl command and the BIoT device enrolment request may be authenticated by the distributed blockchain network. On successful authentication of the curl command, the BIoT device may be enrolled on the plurality of blockchain channels.

The operations or transactions as described in present disclosure may be executed by a smart contract.

The curl command, as described herein, may refer to a command-line tool for transferring data using various network protocols. The curl command may be used to exchange data between the device and the BIoT server platform.

According to an embodiment, the enrollment of a BIoT device may include firstly requesting a digital certificate or a TLS certificate from a certification authority for the device as illustrated in FIG. 4. The request to a certification authority may include the unique identifier of the device. The certification authority may generate a cryptographic chain of digital certificates or TLS certificates for the device. The digital certificate or TLS certificate may include a combination of key pair of a public key and a private key for the device. The device may thereafter be configured to include in the enrolment request the digital certificate or TLS certificate obtained from the certification authority to form a wallet identity of the device. The wallet identity may include the unique identifier of the device. Thereafter, a registration or enrolment request may be made to the BIoT server platform and the plurality of blockchain channels. The registration or enrolment request may include the wallet identity of the device. The BIoT server platform or the plurality of blockchain channels may be communicatively connected to the certification authority and configured to authenticate the wallet identity of the device from the certification authority. On confirming the wallet identity of the device, the device is registered by the BIoT server platform and a record of device registration is made on the blockchain network.

In an embodiment, a BIoT application is run on the BIoT device. The BIoT application provides a frontend interface to the BIoT device for performing operations on the blockchain network. The operations may include creating or feeding data into the blockchain, updating or deleting data from the blockchain, requesting data access, processing operations such as monitoring intrusion detection, activating the sensor connected to the BIoT device to feed data into the blockchain, performing conditional statement or triggering a smart contract. The BIoT application may be configured to display on the BIoT device, the data retrieved from the blockchain network, or results of the operation performed.

At 508, a device is authenticated by receiving endorsement by a plurality of peers on the blockchain network connected to the BIoT server platform using the unique identifier of the device, according to an embodiment. The endorsing peer referred herein includes the blockchain node that approves a transaction before submitting it to the other nodes on the blockchain network. The blockchain network may refer to each or any one of the plurality of blockchain channels. In this step, the device makes an authentication request to BIoT server platform to access data on the blockchain network or perform an operation on the blockchain network. The authentication request may include the unique identifier of the device attempting to make a connection to the blockchain network. The endorsing peer verifies the whether the unique identifier of the device attempting to connect to the BIoT server platform or the blockchain network matches with the record of registered devices on the blockchain network. If a match is found, the endorsing peer authenticates the device and logs the device in the blockchain record. Thereafter, the device log is shared with the other peers on the blockchain network.

According to an embodiment, the authentication request may include the wallet identity of the device. The wallet identity may include the digital certificate or the TLS certificate or the unique identifier of the device. The BIoT server platform or the blockchain network may be communicatively connected to the certification authority and configured to authenticate the wallet identity of the device from the certification authority. The authentication of wallet identity may include matching key pair in the digital certificate or the TLS certificate. On confirming the wallet identity of the device, the device is authenticated by the BIoT server platform and a record of device log is made on the blockchain network.

According to an embodiment, an endorsing peer on the blockchain network may receive the authentication request from the device. The authentication request may include the wallet identity of the device. The blockchain network that includes the endorsing peer may be communicatively connected to the certification authority. The endorsing peer may authenticate the device by matching the key pair of the device in the digital certificate or the TLS certificate. On receiving confirmation from the certification authority, the endorsing peer may verify the wallet identity of the device with the registered device records in the blockchain network. If a match is found, the endorsing peer authenticates the device and logs the device in the blockchain record. Thereafter, the device log is shared with the other peers on the blockchain network.

At 510, data is streamed from the sensors to the BIoT server platform via the authenticated device, in an embodiment. The sensors may be communicatively connected to the BIoT device. The sensors include a temperature sensor, a pressure sensor, a proximity sensor, an accelerometer and gyroscope sensor, an IR sensor, an optical sensor, an illumination sensor, a humidity sensor, a motion sensor, a sound sensor, a magnetic sensor, and an air quality sensor. The sensors may include a processing unit to encode the data recorded by the sensor and communicate the encoded data to the BIoT device in form of a signal. The sensors may be physically located or embedded on the BIoT device and directly collect data at the BIoT device, according to an embodiment. Alternatively, the sensors may be, physically located apart from the BIoT device and communicatively connected to the BIoT device. The BIoT device may be configured to receive and process the continuous flow of sensor data.

According to an embodiment, the sensors may include a unique device identifier. The sensors may include a processing unit to communicate a data packet comprising the time stamped sensor data and the unique device identifier for the sensor.

At 512, the BIoT device encrypts the sensor data instantaneously on receiving the sensor data and simultaneously communicates the encrypted data to the BIoT server platform.

The BIoT device may employ a cryptographic algorithm to encrypt the sensor data including symmetric key algorithms and asymmetric key algorithms such as Triple DES, AES, RSA Security, or cryptographic hash algorithms such as MD5, SHA-1, SHA-256, SHA-512, or SHA-1024. The BIoT device may be configured to automatically select an encryption method depending on the sensor data for faster encryption and communication.

The BIoT server platform is configured to receive the incoming stream of data from the BIoT device. According to an embodiment, the BIoT server platform may decrypt the data received from the BIoT device before transmitting it over the blockchain network.

At 514, the data received from the BIoT device is broadcast to the endorsing peers. The endorsing peer referred herein includes the blockchain node that approves a transaction before submitting it to the other nodes on the blockchain network. The endorsing peers validate the data received from the BIoT device. On successful validation, the data is shared over the blockchain network.

At 516, the blockchain network ledger is updated and a consensus is achieved to include the data received and stored on the blockchain network after receiving validation from the endorsing peers, according to an embodiment.

At 518, the frontend device may be configured to display the device data and sensor data, according to an embodiment. The frontend device may display analytical information on updated status of the blockchain network.

According to an embodiment, the frontend device may receive an operation request to provide the updated status of the blockchain network to reflect analytics on the data stored and historical record of the data sets stored on the blockchain.

Figure 6:
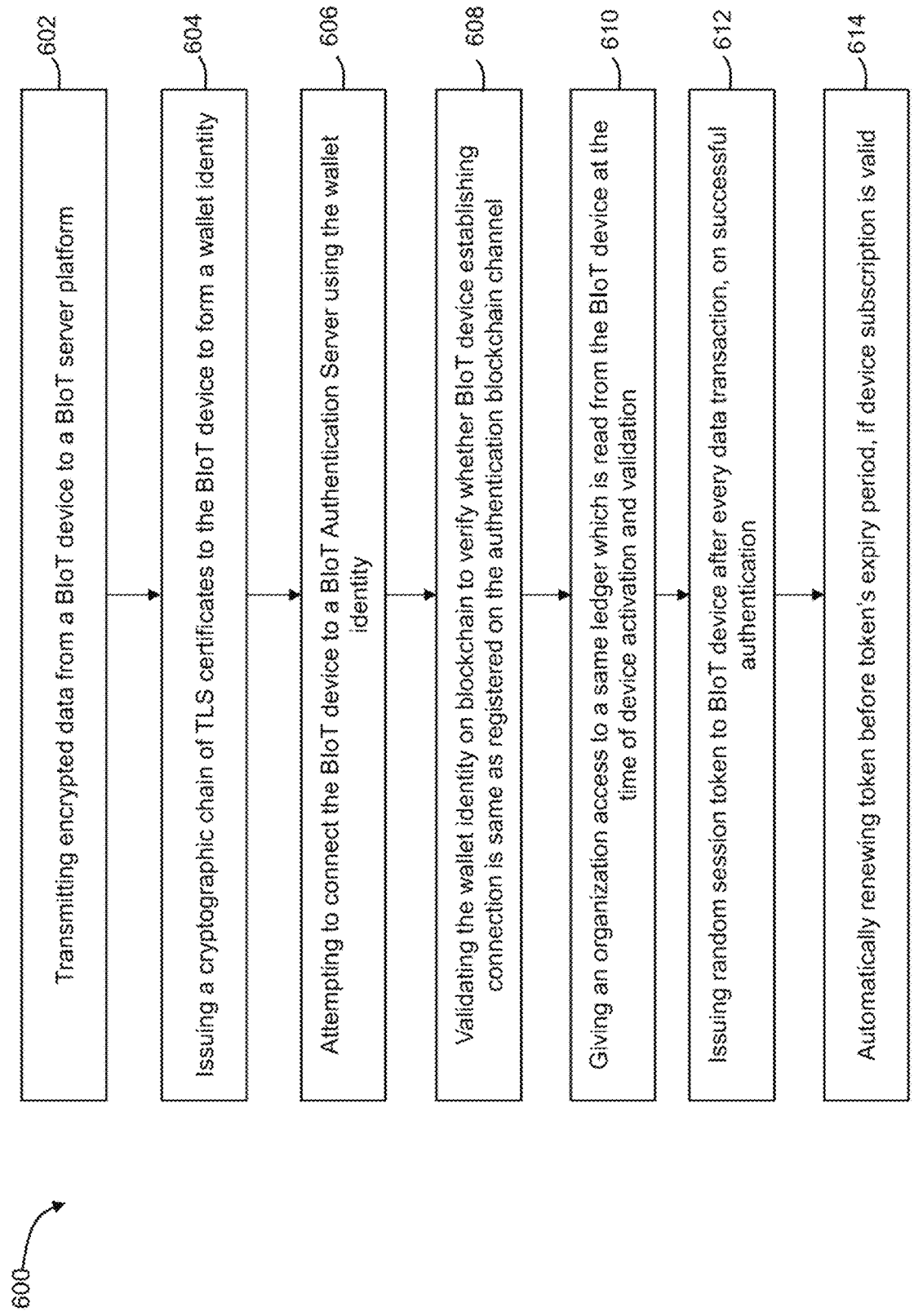
FIG. 6 is a flow diagram of a method of device authentication on the BIoT server platform for providing secure access to organizational data, according to an embodiment.

FIG. 6 is a flow diagram of a method 600 of authenticating a device attempting to connect to the blockchain server platform or the blockchain network, according to an embodiment. The method 600 may be implemented using the system 100 described above. It should be noted that the method 600 is for authentication of a BIoT device. Data collection from the sensor or the BIoT device, encryption of data and network communication steps in the method 600 are generally same as described for the method 500 above. The blockchain network as described herein may refer to each or any one of the plurality of blockchain channels as illustrated in FIG. 4.

At step 602, data is transmitted from the BIoT device to the BIoT server platform in an encrypted format. The BIoT device may be communicatively connected to the BIoT server platform. The data transmitted from the device may include a continuous data stream received from a plurality of sensors and actuators, including pressure, motion, and operational movements. The BIoT device may be configured to encrypt the data before transmitting the data to the BIoT server platform.

At step 604, the BIoT device is issued a chain of TLS certificates from a certification authority. The BIoT server platform may be communicatively connected to a certification authority. The certification authority is configured to generate new TLS certificates for the devices after each transaction on the blockchain network. The certification authority may also verify the wallet identity previously issued to the registered BIoT devices on the BIoT server platform. The BIoT server platform and the blockchain channels store wallet identities of the registered devices as described in step 506 of method 500. The wallet identity of the registered device may include a device identifier such as UDID (Unique Device ID) or UUID (universally unique identifier) or a digital certificate or a TLS certificate for the device. The wallet identity of a device may be stored in an encrypted format.

Further explaining step 604, the BIoT server platform is configured to issue a cryptographic chain of TLS certificates to the device transmitting data to the BIoT server platform. The digital certificate or TLS certificate may include a combination of key pair of a public key and a private key for the device. The device may thereafter be configured to include the digital certificate or TLS certificate obtained from the certification authority to form a wallet identity of the device. The wallet identity may include the unique identifier of the device.

At 606, the device is set out to connect to a BIoT Authentication Server using the wallet identity issued to the device in step 604. The BIoT Authentication Server is configured to decrypt the incoming data. The connection request by the device may be made to the BIoT server platform. The connection request may include the wallet identity of the device.

The BIoT Authentication Server is communicatively connected to an authentication blockchain channel. The authentication blockchain channel includes a plurality of peers, each storing a ledger of device and data transactions. The ledger further includes the wallet identities of the devices registered on the authentication blockchain channel. The ledger is configured to store the wallet identities and the transaction records in an encrypted format. The peers are linked to each other, wherein each block contains a hash value of the previous block. In order to achieve a secure authentication of records, the peers may use consensus algorithms such as Practical Byzantine Fault Tolerance Algorithm (PBFT), the Proof-of-Stake Algorithm (PoS) and the Delegated Proof-of-Stake Algorithm (DPoS).

In an embodiment, the BIoT server platform on receiving the connection request by a device using the wallet identity, decrypts the wallet identity issued to a device for authentication. In another embodiment, the BIoT sever platform may be configured to generate a hash-value of the wallet identity and the hash-value of the wallet identity may be used for authentication of the device.

At the step 608, the wallet identity of the connecting device is validated on the authentication blockchain channel in a decentralized manner. The validation includes confirming whether the wallet identity of the connecting device matches with a wallet identity for a registered device stored on the authentication blockchain channel.

The BIoT server platform or the authentication blockchain channel may be communicatively connected to the certification authority and configured to authenticate the wallet identity of the device from the certification authority.

At step 610, on confirming the wallet identity of the device, an organization is given access to the data record on the ledger from the same state as read from the device at the time of device activation and validation. The organization refers to the body subscribing to the BIoT server platform. The organization has a plurality of devices registered on the BIoT server platform and the wallet identities of the registered devices is stored on the plurality of blockchain channels.

Thereafter, after validation, the data transmitted by the device may be stored on the plurality of blockchain channels in an encrypted format. The data may be stored in packets or periodically spaced data transactions.

According to an embodiment, restrictions may be set for the authenticated device on data access and data values being stored on the plurality of blockchain channels. The restrictions may be based on the organizational policies encapsulated by the BIoT server platform.

At 612, randomly generated session tokens are issued to the successfully authenticated device after every data transaction. The session token may include a unique session ID in an encrypted format to identify and record a specific data transaction, according to an embodiment. Further, the session token may include device credentials including wallet identity, digital certificate or TLS certificates. In an embodiment, a timestamp is recorded at each data transaction and stored on the distributed ledger for verification and monitoring.

The BIoT server platform or the authentication blockchain channel may be communicatively connected to the certification authority and configured to generate the session token for the device automatically after each data transaction.

At 614, the session token is automatically renewed before the expiry of session token if the service subscription is still valid. The BIoT server platform may be configured to verify the subscription state for the device after every data transaction. The subscription status of the device may be stored in the organization record over the plurality of blockchain channels.

BIoT secure management client deployed on the device performs intrusion detection, integrity monitoring, system auditing, threat detection and response and constantly analyzes the regulatory compliance ratings of the device, thus providing real time security analysis of the device to the system administrator. The subsequent logs are also put on the blockchain channel, hence establishing a trust in a decentralized environment.

Figure 7B:
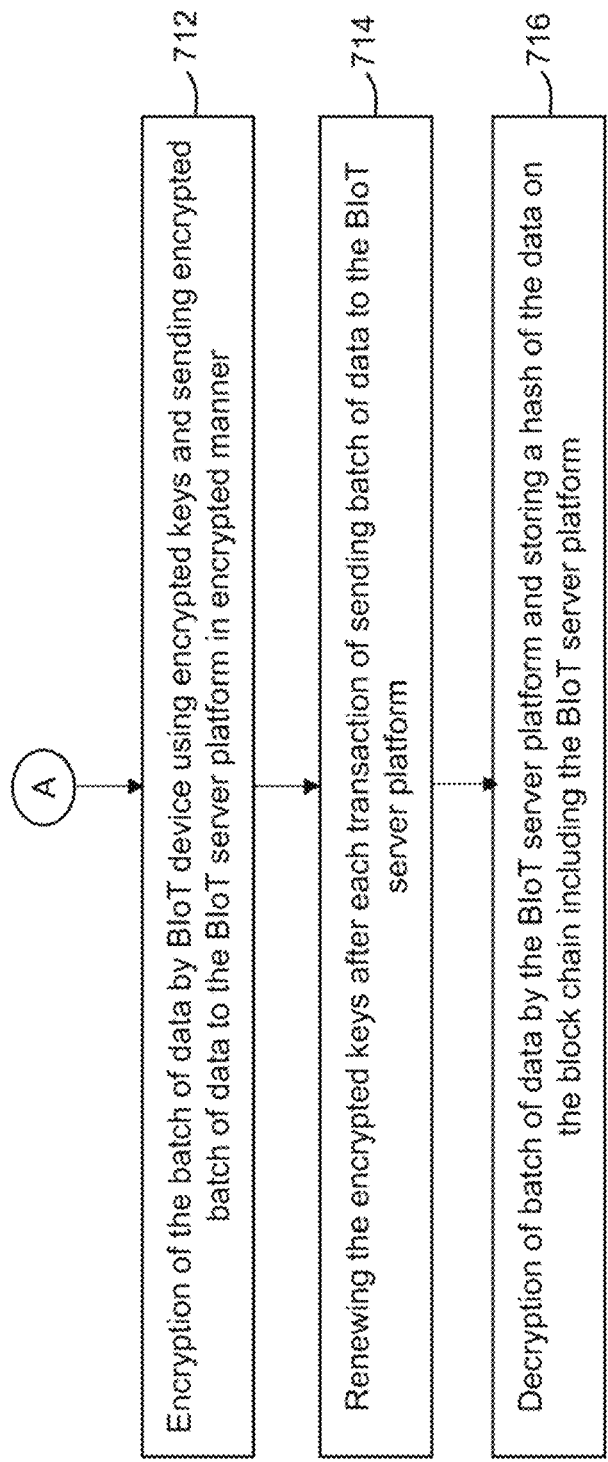

FIGS. 7A and 7B are flow diagrams of a method 700 of data management for a device connected to the blockchain server platform or the blockchain network, according to an embodiment.

At step 702, the authenticated BIoT device is connected to the BIoT server platform. Specifically, the authenticated BIoT device is connected to a BIoT data server. The BIoT data server is configured to decrypt incoming data and send it for analytical purposes to other microservices.

At step 704, the BIoT data server, on connecting with the authenticated BIoT device, issues encrypted keys to the BIoT device. The encrypted keys are then transmitted in an encrypted manner to the authenticated BIoT device, wherein only the authenticated BIoT device has the capability to decrypt the encrypted keys.

In an embodiment, a chain of encrypted keys is issued to the BIoT device. The BIoT data server may be communicatively connected to a certification authority. The certification authority is configured to generate new encrypted keys for the BIoT devices on the blockchain network. The certification authority may also verify the encrypted keys previously issued to the registered BIoT devices on the BIoT server platform. The BIoT server platform and the plurality of blockchain channels store the encrypted keys of the registered BIoT devices as described in step 506. The encrypted keys for the registered BIoT device may include a device identifier such as UDID (Unique Device ID) or UUID (universally unique identifier) or a digital certificate or a TLS certificate for the BIoT device.

Further explaining step 704, the BIoT data server is configured to issue a cryptographic chain of encrypted keys to the BIoT device transmitting data stream to the BIoT server platform. The encrypted keys may include a combination of key pair of a public key and a private key for the device. The encrypted keys may be included in a digital certificate or the TLS certificate. The BIoT device may thereafter be configured to include the encrypted keys or digital certificate, or TLS certificate obtained from the certification authority to form a wallet identity of the BIoT device. The wallet identity may include the unique identifier of the BIoT device.

At 706, the selected BIoT device decrypts the encrypted keys. The selected BIoT device refers to the device authenticated by the BIoT server platform and the receiving terminal for the encrypted keys issued by the BIoT data server.

At 708, the BIoT device begins to read data received from a plurality of terminal devices. The plurality of terminal devices may include sensors, actuators, or industrial equipment. The plurality of terminal devices may automatically collect a stream of data from the environment such as pressure, motion, and humidity. The plurality of terminal devices may also receive a manual input.

At 710, the BIoT device packs the data received from the plurality of terminal devices into a plurality of batches at periodic intervals. For example, data received from the front-end terminals may be packed into batches every 0.5 seconds. The BIoT device is configured to concurrently receive data from the plurality of terminal devices and patch heterogenous data into batches.

At 712, the BIoT device encrypts the batch of data using the encrypted keys and sends the encrypted batch of data to the BIoT data server in an encrypted manner. Specifically, the BIoT device may use the public key of the BIoT data server to encrypt the batch of data and use an encrypted medium to send the encrypted data batch to the BIoT data server.

At 714, the encrypted keys are renewed for the BIoT device after each transaction of sending batch of data to the BIoT data server. Specifically, the BIoT data server is configured to issue a new pair of encrypted keys after a batch of data is sent by the device to the BIoT data server.

At 716, the batch of data received by the BIoT data server is decrypted by the BIoT data server. Thereafter, a hashvalue of the decrypted data is generated and stored on the blockchain channel. The BIoT data server uses the encryption keys to authenticate the source of the data batch.

The storage of hash-value of the data on the blockchain channel provides data immutability. Organization can verify the data anytime from the hash-values stored on the blockchain channel. Further, the data on the blockchain can also be retrieved for analytical purposes.

BIoT secure management client deployed on the device performs intrusion detection, integrity monitoring, system auditing, threat detection and response and constantly analyzes the regulatory compliance ratings of the device, thus providing real time security analysis of the device to the system administrator. The subsequent logs are also put on the blockchain channel, hence establishing a trustless and decentralized environment.

Figure 8:
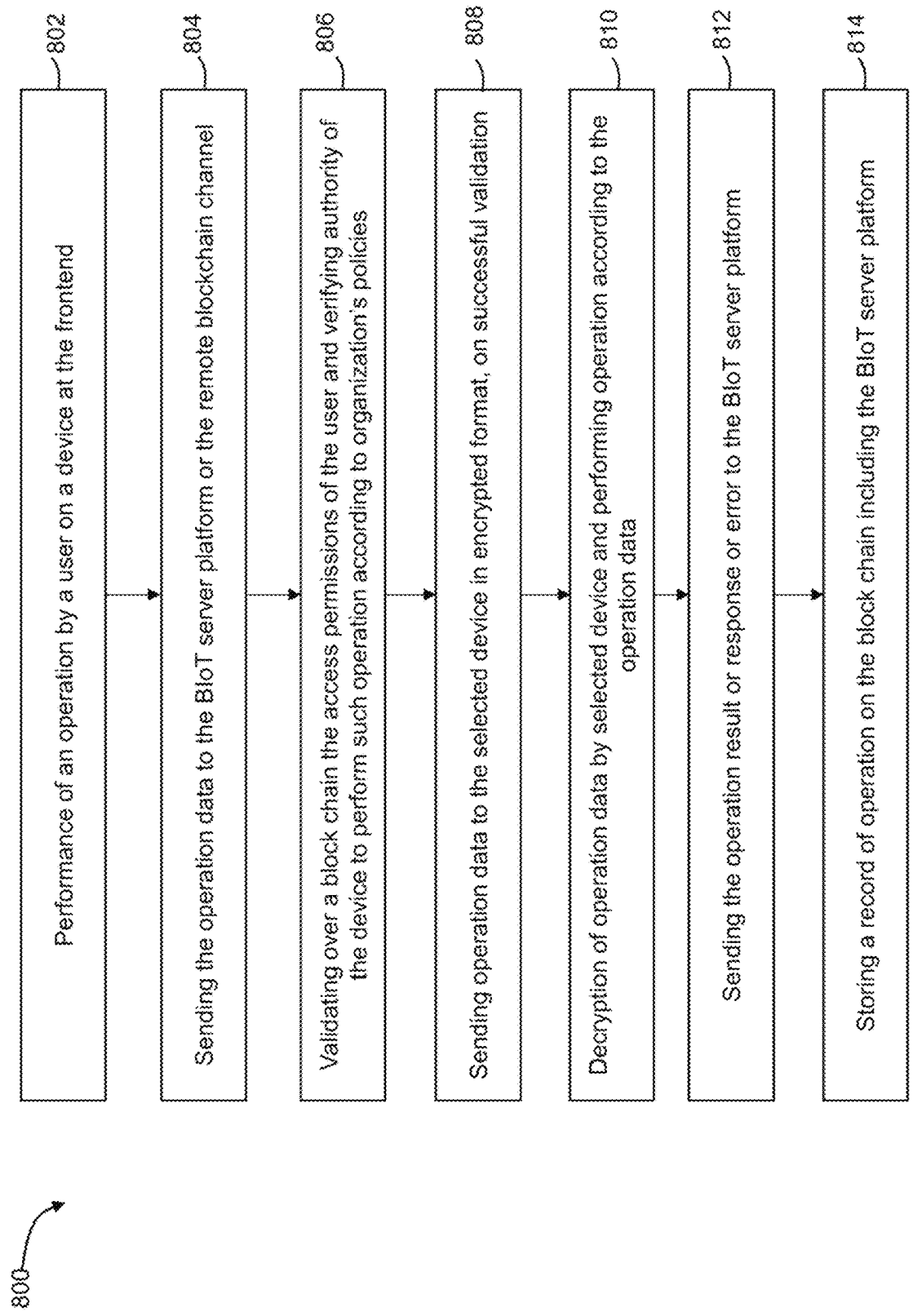
FIG. 8 is a flow diagram of a method of remote management and verifying access permissions before performing an operation based on the instructions inputted by the user, according to an embodiment.

FIG. 8 is a flow diagram of a method 800 for remote management of a front-end device connected to the blockchain server platform or the blockchain network, according to an embodiment. The blockchain network may include a plurality of blockchain channels as described in system 100.

At 802, a user performs an operation on the front-end device. The front-end device may include an electronic device with a user interface, a sensor, an actuator, or an industrial equipment. The user may perform any operation on the front-end device or input any data or a conditional instruction to the front-end device. The operation may include manipulating the front-end device or providing desired instruction to the front-end device to be executed on the target BIoT device.

At 804, the operation data is sent to the BIoT server platform and the blockchain channels. Specifically, the front-end device is configured to convert the operational instructions into operation data and transmit the operation data to the BIoT server platform.

In an embodiment, the front-end device is configured to encrypt the operation data before transmission. Further, the front-end device is configured to transmit the wallet identity of the front-end device and the BIoT device in conjunction with the operation data. The BIoT server platform decrypts the operation data and the wallet identity of the front-end device and the BIoT device.

In an embodiment, the operational instruction could be a smart contract. A smart contract may encode a series of instructions to be automatically executed in event of achieving a pre-set data state. The smart contract may trigger operational instructions to a plurality of BIoT devices.

At 806, the operation data and the wallet identity of the front-end device and the BIoT device is validated over the blockchain. Specifically, the BIoT server platform verifies from the distributed ledger whether the front-end device is permitted to provide operational instructions and BIoT device is permitted to perform the operation. Further, the BIoT server platform verifies from the distributed ledger whether the operation is valid for the BIoT device according to the organization's policies. Furthermore, the access permissions of performing the operation on the BIoT device are verified.

For example, in an industrial setting, the BIoT device could be a robotic actuator on the assembly line of a manufacturing unit. A user inputs his/her credentials and operational instructions on the robotic actuator to perform a maneuver. The robotic actuator would thereafter convert the operational instructions and user credentials into a digital signal and combine the robotic actuator's wallet identity to the digital signal. The digital signal would then be encrypted and transmitted to the BIoT server platform. The BIoT server platform on receiving the encrypted message, decrypt the message and verify the credentials in the message according to the following steps.

Firstly, the wallet identity of the BIoT device is verified. This includes authenticating, from the records on the blockchain ledger, whether the wallet identity of the device has been registered in the organization the operation is being performed. Secondly, the credentials of the user would be verified on the blockchain ledger, including the access permissions granted to the user. Thirdly, the operational data would be verified from the organizational policy to confirm whether the BIoT device selected to perform the operation has the permission to perform such operation. Fourthly, the operation collection permissions of the front-end device would be verified from the organizational policy on whether the front-end device receiving operational instructions has the permission to request such operational instructions.

At 808, if the validation in 806 is successful, the operational data is sent to the selected BIoT device in encrypted format. Specifically, on successful validation, the BIoT server platform is configured to transmit the operational instructions to the selected BIoT device, wherein the user intends the selected device to perform the operational instructions.

At 810, the selected BIoT device receives the encrypted operational instructions, decrypts the operational instructions and performs an operation according to the operational instructions.

At 812, the selected device transmits the result or the outcome of the execution of operation performance to the BIoT server. Specifically, the selected device is configured to record the outcome of the operation, wherein the outcome of the operation may include a successful performance or an error. The outcome of the operation is transmitted to the BIoT server platform.

In another embodiment, the selected BIoT device encrypts the outcome of the operation and transmits the encrypted performance outcome to the BIoT server platform.

At 814, the record of operation is stored on the plurality of blockchain channels. Specifically, the BIoT server is configured to receive the outcome of the operation and store the outcome of the operation on the blockchain ledger.

In another embodiment, the BIoT server platform is configured to decrypt the encrypted outcome of operation and store the outcome of the operation on the blockchain ledger.

BIoT secure management client deployed on the device performs intrusion detection, integrity monitoring, system auditing, threat detection and response and constantly analyzes the regulatory compliance ratings of the device, thus providing real time security analysis of the device to the system administrator. The subsequent logs are also put on the blockchain channel, hence establishing a trustless and decentralized environment.

The systems, devices and methods described herein may be utilized to provide an intrusion detection system wherein a record of malicious activity violating organizational policy and unsuccessful device authentication attempts are stored on the blockchain channel. By generating a wallet identity for all the devices attempting to connect with the BIoT server platform, the records stored on the connection requests may be retrieved later by the system administrator to identify the malicious devices. Further, the use of a plurality of servers in the BIoT server platform helps in monitoring the entire network for suspicious activities. Due to the advanced authentication standards provided by the blockchain networks, the intrusion detection system of the present invention prevents malicious devices from unintended access and control. Furthermore, a record of these malicious devices, including the device identities are stored in a timestamped format on the plurality of blockchain channels that assists intrusion detection and intrusion record retrieval. Certain intrusion detection implementations and advantages of the embodiments herein are described below.

According to an embodiment, an intrusion detection report may be generated wherein the intrusion detection report includes an event of unsuccessful authentication of the plurality of IoT devices, a list of the plurality of registered BIoT devices on the blockchain network, a system audit, feeding data into the plurality of blockchain network channels, activating a sensor connected to the plurality of BIoT devices to feed data into the blockchain network channels, performing conditional statement or triggering a smart contract.

According to various embodiments, the peers in the blockchain network scan the monitored systems and networks to identify malware, rootkits and suspicious anomalies. Peers can detect hidden files, cloaked processes or unregistered network listeners, as well as inconsistencies in system call responses.

The embodiments described herein provide for security analytics by collecting, aggregating, indexing, and analyzing security data to help organizations detect intrusions, threats, and behavioral anomalies. As cyber threats are becoming more sophisticated, real-time monitoring and security analysis are needed for fast threat detection and remediation. Therefore, the light-weight technology described in the present embodiment provides the necessary monitoring and response capabilities, while BIoT server platform provides the security intelligence and performs data analysis.

For example, in addition to BIoT peer capabilities, the BIoT server platform uses a signature-based approach to intrusion detection, using its regular expression engine to analyze collected log data and look for indicators of compromise.

According to an embodiment, the BIoT server platform may be configured to raise an alarm on detection of any anomaly in device connection or access control corresponding to the organizational policy.

Further, the present embodiments provide for log data analysis wherein the peers on the blockchain channels read operating system and application logs, and securely forward them to the system administrator for rule-based analysis and storage. The method assists the user to notice application or system errors, misconfigurations, attempted and/or successful malicious activities, policy violations, and other security and operational issues.

Further, the present embodiments provide for file integrity monitoring, wherein the BIoT server platform monitors the file system, identifying changes in content, permissions, ownership and attributes of files that need attention. The BIoT server platform also natively identifies users and applications used to create or modify files.

File integrity monitoring capabilities can be used in combination with threat intelligence to identify threats or compromised hosts. In addition, several regulatory compliance standards, such as PCI DSS require file integrity monitoring.

Further, the present embodiments provide automated vulnerability detection, wherein the peers on a blockchain channel pull software inventory data and send the software inventory data information to the server. The software inventory data is thereafter correlated with continuously updated CVE (Common Vulnerabilities and Exposure) databases, in order to identify well-known vulnerable software.

Automated vulnerability assessment is advantageous in providing the user the ability to identify the weak spots in critical data assets and take action before being exploited by attackers.

The present embodiments provide for configuration assessment, wherein the BIoT server platform monitors system and application configuration settings to ensure the configuration settings are compliant with the organization's security policies, standards and/or guides. Peers on the blockchain channels perform periodic scans to detect applications that are known to be vulnerable, unpatched, or insecurely configured.

Additionally, the configuration checks can be customized, tailoring them to properly align with an organization. Alerts may be generated to include recommendations for better configuration, references, and mapping with regulatory compliance.

The present embodiments provide incident response capabilities and active responses to perform various countermeasures to address active threats, such as blocking access to a system from the threat source when certain criteria are met. In addition, BIoT devices can be used to remotely run commands or system queries, identifying indicators of compromise (IOCs) and perform other live forensics or incident response tasks.

Various embodiments as described herein provide necessary data security controls to become compliant with industry standards and regulations. The necessary security control features of the present disclosure, combined with scalability and multi-platform support may help organizations meet technical compliance requirements.

The BIoT system may be widely used by payment processing companies and financial institutions to meet PCI DSS (Payment Card Industry Data Security Standard) requirements. The user interface on the BIoT system provides reports and dashboards that can help with industrial regulations such as GDPR, NIST 800-53, GPG13, TSC SOC2, and HIPAA. The BIoT system may refer to the system of present disclosure.

The BIoT system helps monitor cloud infrastructure at an API level, using integration modules that are able to pull security data from well-known cloud providers like Amazon AWS, Azure, or Google Cloud. In addition, BIoT peer provides rules to assess the configuration of an organization's cloud environment, thereby easily spotting weaknesses.

Furthermore, BIoT lightweight and multi-platform peers are commonly used to monitor cloud environments at the instance level.

The present embodiments achieve containers security by providing security visibility into hosts and Docker containers, monitoring container behavior and detecting threats, vulnerabilities, and anomalies. The BIoT peer has native integration with the Docker engine that allows users to monitor images, volumes, network configurations, and running containers.

The BIoT system continuously collects and analyzes detailed runtime information. For example, alerting for containers running in privileged mode, vulnerable applications, a shell running in a container, changes to persistent volumes or images, and other possible threats.

The present systems and methods are operating system agnostic and available in Mac, Windows and Linux based operating systems, including operating systems deployed on smart phones.

The present systems and methods are device architecture agnostic and works on all the major devices, that includes devices with ARM and AMD architecture devices.

Figure 9:
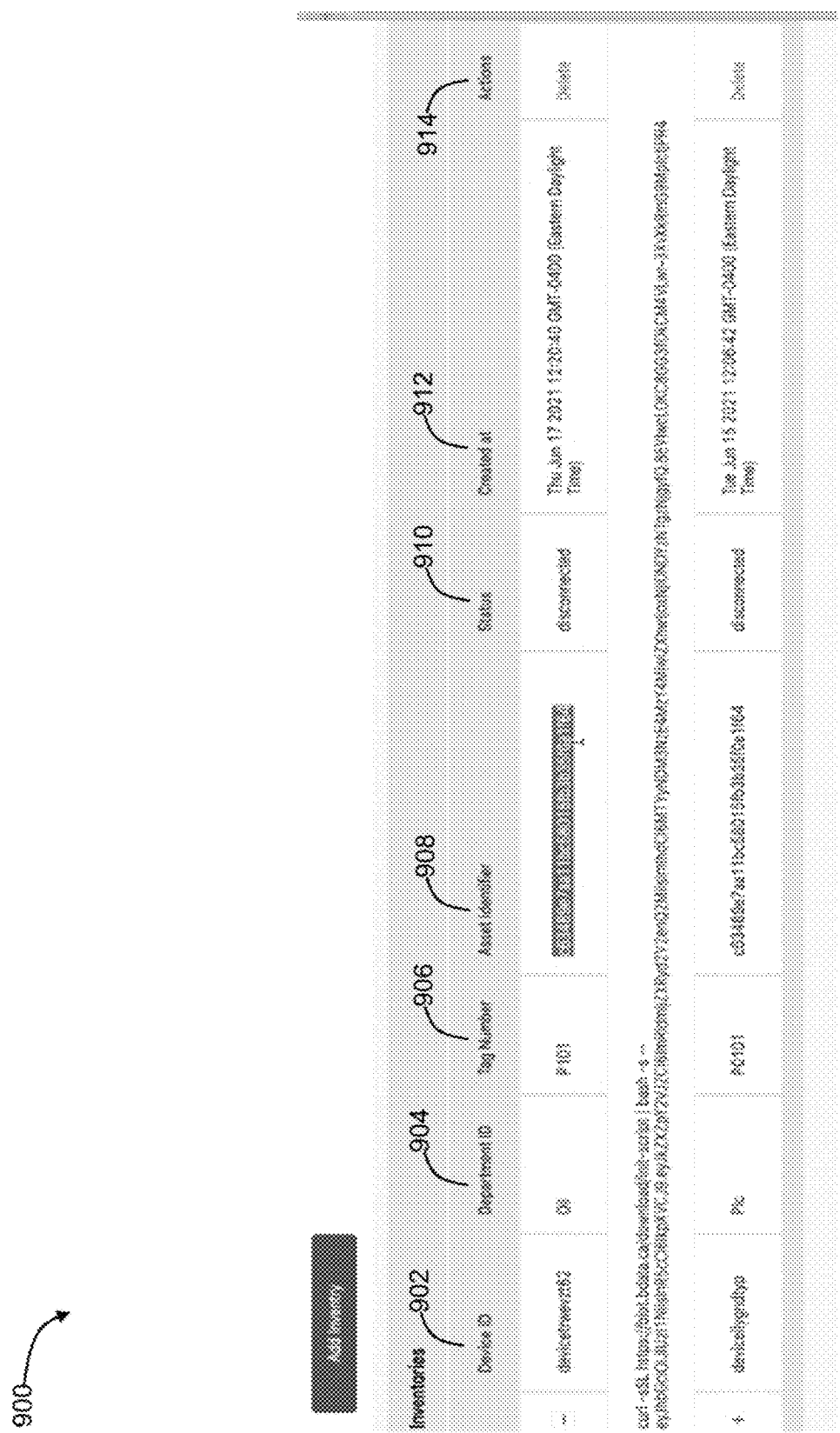
FIG. 9 illustrates a screen capture of an example of displaying an inventory of registered devices, according to an embodiment.

Referring to FIG. 9, illustrated therein is a screen capture 900 of an example of user interface displaying an inventory of registered devices, according to an embodiment. For the purposes of this section, new device refers to a BIoT device 106 registered on system 100 and connected to BIoT server platform 128 illustrated in FIG. 1. The screen capture reflects services offered to an organization enrolled on the system 100. It is to be understood that an authorized user from the organization makes selections on the user interface to perform operations and receive services offered by the system 100.

Device ID 902 may include the information provided by the user to identify the device with respect to the location of the deployment of the device. The Department ID 904 may refer to the section within an industrial organization where the device is deployed. For example, the Department ID 904 may include an identification of a programmable logic controller (PLC). Tag number 906 may include the information about the equipment where the device is deployed to collect the information using sensors from that particular equipment. The Asset Identifier 908 is the Device Board ID or Device ID 902, which is unique and not duplicated within the BIoT network of the devices. In order to successfully enroll the device on the BIoT network, a device ID 902 is mandatory to be provided on the front-end device. Once the device ID is provided to the front-end device with the instruction to add new inventory, a curl command is created. The curl command is thereafter entered on the BIoT device terminal to download the BIoT peer on the BIoT device. The BIoT device may be the device 402 and front end may be front end device 404 of FIG. 4.

The Status 910 reflects the current connection and data transmission state of the registered BIoT device. The system 100 is configured to monitor all the registered BIoT devices in real-time. If the registered BIoT device is connected to the BIoT server platform 128 at a specific time, the Status 910 corresponding to the Device ID 902 associated with the registered device may reflect as "connected" or "live" or "data transmission" at that specific time. If the registered device is not connected to the BIoT sever platform 128, at a specific time, the status 910 corresponding to the Device ID 902 associated with the registered device may reflect as "disconnected" at that specific time, as illustrated in FIG. 9.

The system 100 is configured to keep a digital record of the time at which a device was registered. FIG. 9 depicts a timestamp 912 of the date and time on which a device was registered to the system 100.

The system 100 is configured to remove and unregister a device connected to the BIoT server platform 128. Actions 914 provides a user an option to remove the registered device corresponding to the Device ID 902 by selecting "Delete" on the screen.

Figure 10:
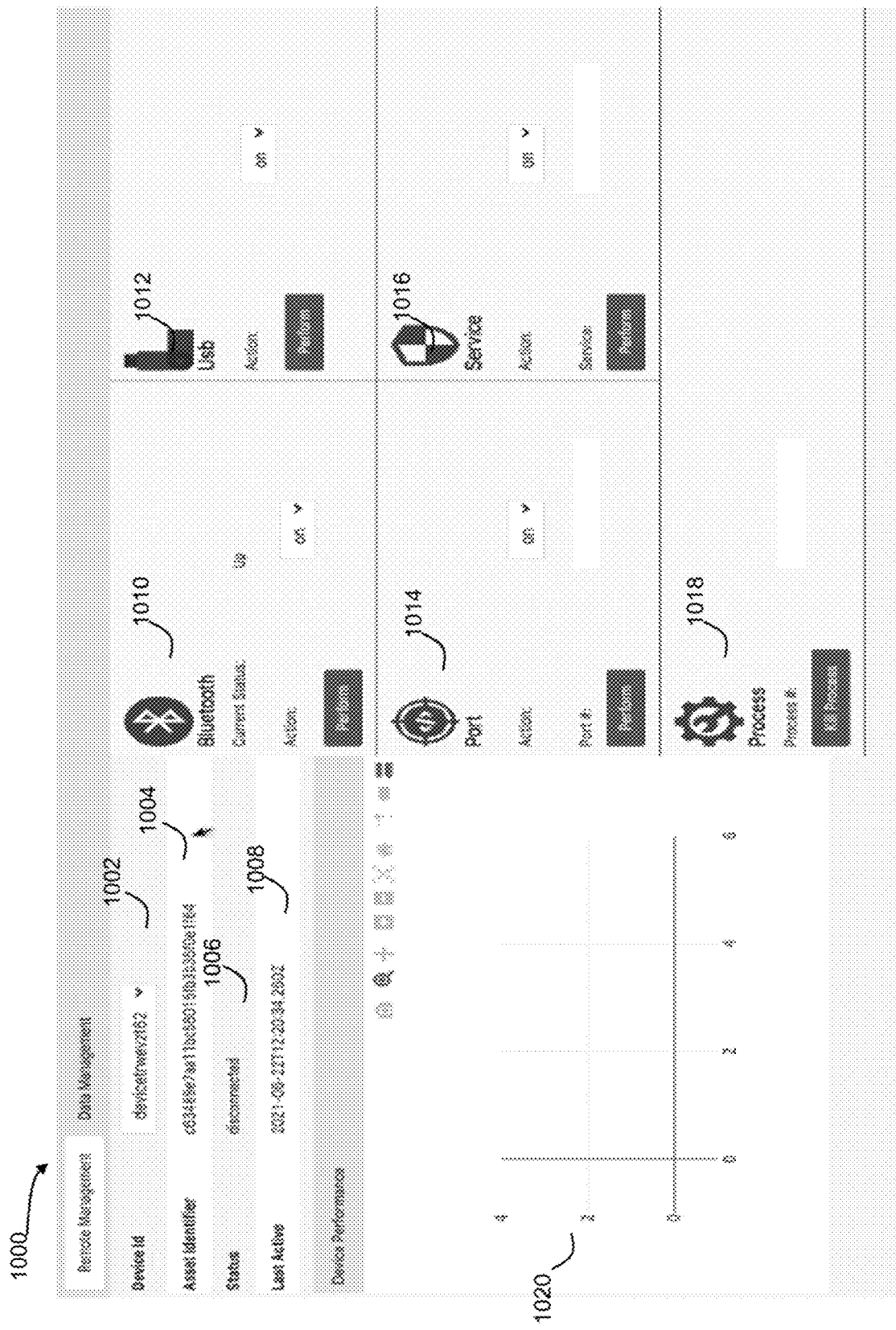
FIG. 10 illustrates a screen capture of an example of remote management of front-end devices, according to an embodiment.

Referring to FIG. 10, illustrated therein is a screen capture 1000 of an example of user interface for remote management of BIoT devices, according to an embodiment. For the purposes of this section, BIoT device refers to a BIoT device 106 registered on system 100, and connected to BIoT server platform 128 depicted in FIG. 1. The screen capture 1000 reflects services offered to an organization enrolled on the system 100. It is to be understood that an authorized user from the organization makes selections on the user interface to perform operations and receive services offered by the system 100.

An authorized user on selecting "Remote Management" on the user interface displays the status of remote management of a plurality of BIoT devices. The user may select a Device ID 1002 from a drop-down menu based on user's preference on the device for which remote management status is to be inquired.

On selecting the Device ID 1002, the asset identifier 1004 corresponding to the device is displayed. The asset identifier 1004 is a unique identification key of a device that can be used globally. Asset identifier 1004 may include the device board ID also, which is a unique identifier for each device.

Status 1006 reflects the connection and operational condition of the device corresponding to the selected Device ID 1002. The status 1006 may be represented as "connected", or "operational", or "disconnected" or another position depending on the activity performed by the device.

Last active 1008 reflects most recent time and date when the device corresponding to the selected Device ID 1002 was connected to the BIoT server platform.

Thereafter, the remote management and operational control of the device corresponding to the selected Device ID 1002 is displayed.

Bluetooth 1010 depicts the real-time status of the Bluetooth connectivity of the device corresponding to the selected Device ID 1002. As displayed in the screen capture 1000, the real-time status is reflected as "Up" which signifies that the Bluetooth port of the device is turned-on to send and receive data, or to connect to another device. Further, the user may select from a drop-down menu in "Action" to turn the Bluetooth port of the device on or off.

USB 1012 depicts the real-time status of the universal serial bus connectivity of the device corresponding to the selected Device ID 1002. As displayed in the screen capture 1000, the real-time status is reflected as "Up" which signifies that the universal serial bus port of the device is open to send and receive data, or to connect to another device. Further, the user may make a selection from a drop-down menu in "Action" to enable or disable the universal serial bus connectivity to avoid physical data breach or intrusion on the device.

Port 1014 depicts the real-time status of a port on the device corresponding to the selected Device ID 1002. The port may refer to a communication interface between two computing devices. The port may include a display port, HDMI port, eSATA, PS/2, or a serial port. The user can select from a port from the plurality of ports on the device from a drop-down menu. As displayed in the screen capture 1000, the real-time status is reflected as "Up" which signifies that the port of the device is open to send and receive data, or to connect to another device. Further, the user may select from a drop-down menu in "Action" to enable or disable the port. Port 1014 allows the user to remotely manage the firewall setting on the device Service 1016 depicts the security service currently being performed by the device corresponding to the selected Device ID 1002. As displayed in the screen capture 1000, the real-time status is reflected as "Up" which signifies that the security service is currently active. Further, the user may select from a drop-down menu in "Action" to enable or disable the port.

Process 1018 depicts the operational instructions currently being executed by the device corresponding to the selected Device ID 1002. Process 1018 allows the user to remotely terminate the undesired processes running on the device.

Graph 1020 shows the BIoT device's performance parameters, which includes the processor speed, battery life, and other key parameters to allow the user to have complete understanding of the device and BIoT performance.

Figure 11:
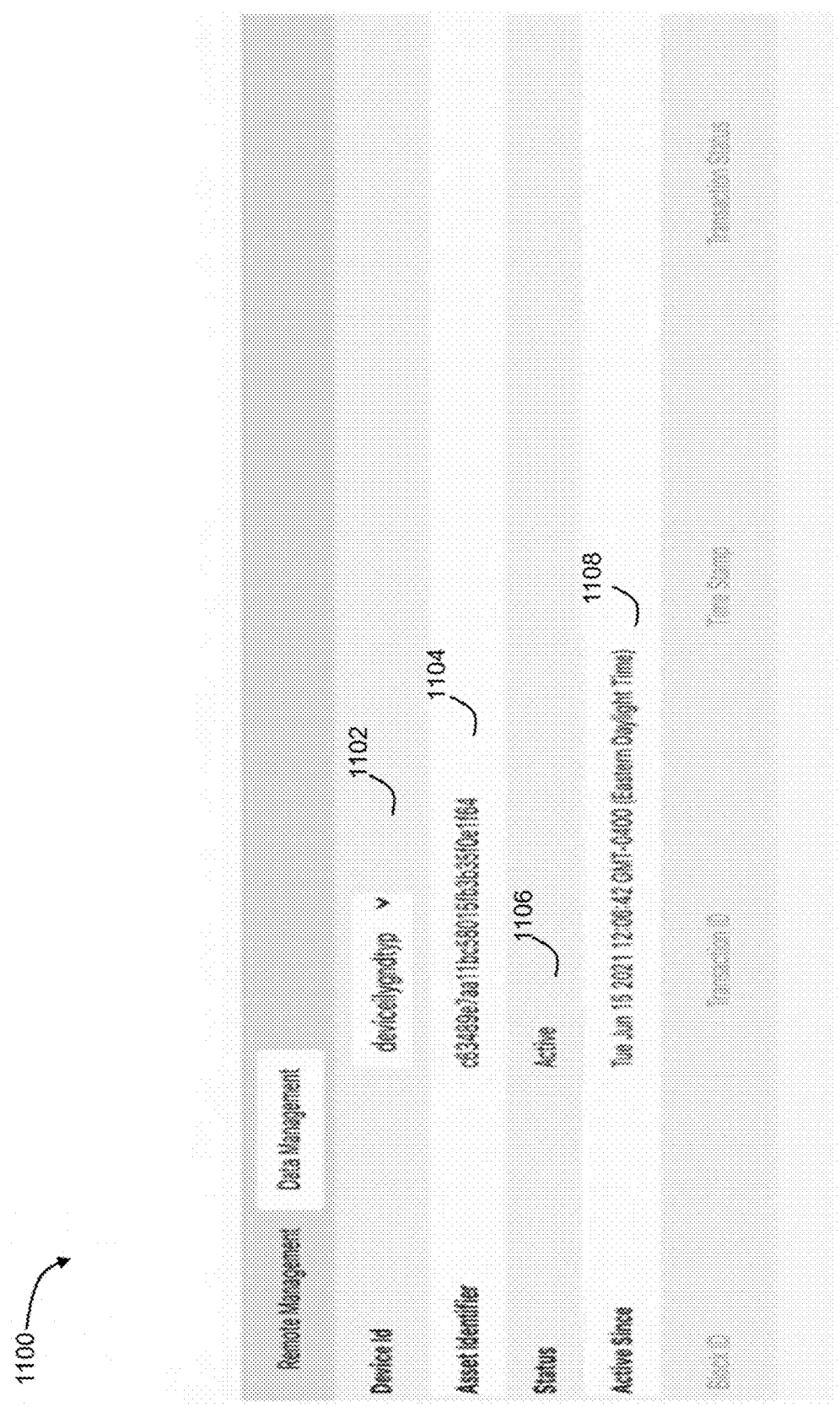
FIG. 11 illustrates a screen capture of an example of data management of registered devices, according to an embodiment.

Referring to FIG. 11, illustrated therein is a screen capture 1100 of an example of data management of registered devices, according to an embodiment. For the purposes of this section, BIoT device refers to a BIoT device 106 registered on system 100 and connected to BIoT server platform 128 illustrated in FIG. 1. The screen capture reflects services offered to an organization enrolled on the system 100. It is to be understood that an authorized user from the organization makes selections on the user interface to perform operations and receive services offered by the system 100.

An authorized user on selecting "Data Management" on the user interface is presented the status of data management of a plurality of BIoT devices. The user may select a Device ID 1102 from a drop-down menu based on the user's preference regarding the device for which data management status is to be inquired.

On selecting the Device ID 1102, the asset identifier 1104 corresponding to the device is displayed. The Asset Identifier 1104 is a unique identification key of a device that can be used globally.

Status 1106 reflects the connection and operational condition of the device corresponding to the selected Device ID 1102. The status 1106 may be represented as "active", "connected", or "operational", or "disconnected" or another position depending on the activity performed by the device.

Active since 1108 reflects most recent time and date when the device corresponding to the selected Device ID 1102 was connected to the BIoT server platform.

Figure 12:
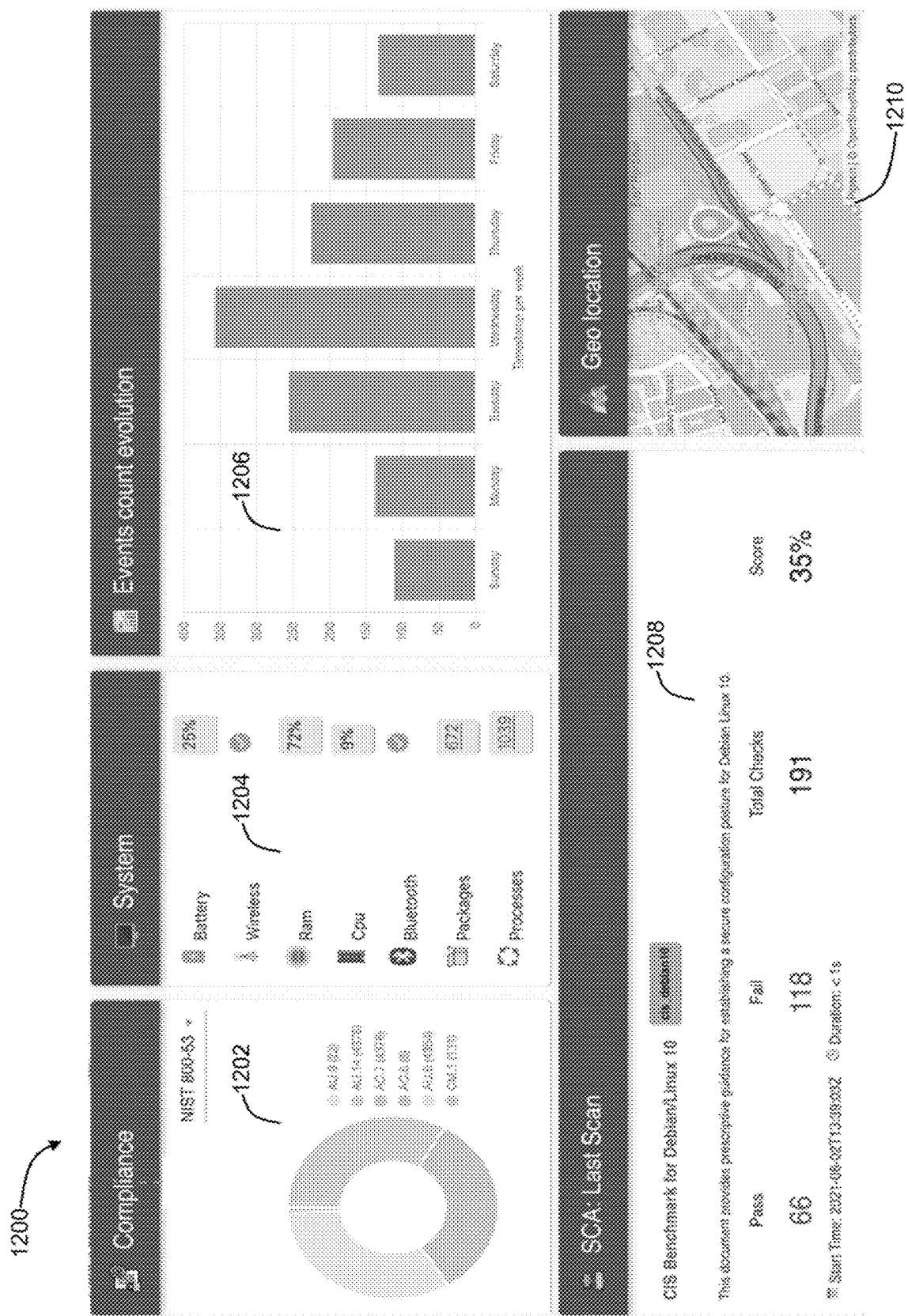
FIG. 12 illustrates a screen capture 1200 of an example of a user interface providing security analysis and intrusion detection services on data transactions conducted by a device, according to an embodiment.

Referring to FIG. 12, illustrated therein is a screen capture 1200 of an example of a user interface providing security analysis and intrusion detection services on data transactions conducted by a device, according to an embodiment. For the purposes of this section, BIoT device refers to a BIoT device 106 registered on system 100, and connected to BIoT server platform 128 depicted in FIG. 1. The screen capture reflects services offered to an organization enrolled on the system 100. It is to be understood that an authorized user from the organization makes selections on the user interface to perform operations and receive services offered by the system 100.

At 1202, Compliance represents an organization's compliance to a plurality of standards on data protection and cybersecurity. The compliance standards include PCI DSS (Payment Card Industry Data Security Standard), GDPR (European General Data Protection Regulation), NIST 800-53 (National Institute of Standards and Technology, United States of America), HIPAA (Health Insurance Portability and Accountability Act, 1996 of United States of America), GPG13 (Protective Monitoring for HMG ICT Systems), and TSC. Further, the system described herein may be configured to determine the number of BIoT devices conforming to each industry standard or pre-deployed intrusion detection rules.

At 1204, system performance indicators are presented of the BIoT devices. The system performance indicators include resources consumed such as battery, energy, RAM, CPU, wireless connection status, packages and processes active in real time.

At 1206, the frequency of events for a specific timeframe is provided. Events may refer to activities or intrusions occurring on the BIoT device or BIoT network, wherein the event is inconsistent with the intrusion detection rules. The intrusion detection rules may refer to the industry standards requirements such as PCI DSS, GDPR.

At 1208, a Software Composition Analysis (SCA) scan report is presented. It is to be understood that a SCA scan is presented for demonstration and any other security and risk scan may be performed. The SCA scan may verify compliance to industry cyber security and defence benchmarks, for example, Centre for Internet Security (CIS) Benchmark for Debian/Linux 10. The SCA scan report 1508 includes the number of BIoT devices meeting the compliance requirements and number of BIoT devices failing to meet the compliance requirements. Further, the SCA scan report 1508 may include number of benchmarks met.

At 1210, geolocation of the BIoT device is provided. The geolocation may be provided using a JavaScript API.

The user interface as illustrated herein may be further configured to display the security services performed by the system 100. For example, security services may include Security events, Integrity monitoring, SCA, and System Auditing services performed for the selected device. A unique identifier of the device selected for intrusion detection system and security analysis may be displayed. For example, "ip-172-31-5-154" selected by the user may represent the unique identifier of a device connected to the BIoT server platform 128 for which security services are performed.

The user interface as illustrated herein may be further configured to indicate the device information for which security services are performed by the system 100. For example, a Device ID corresponding to the device selected for performing intrusion detection and security service, the status of connection to the BIoT sever platform, the device version, the operating system running on the selected device, the date on which the device was registered on the BIoT server platform, and the last date on which the device was connected is displayed.

The user interface as illustrated herein may be further configured to display the tactics and the frequency of tactics used by a hacker to gain unauthorized access to the system.

Figure 13:
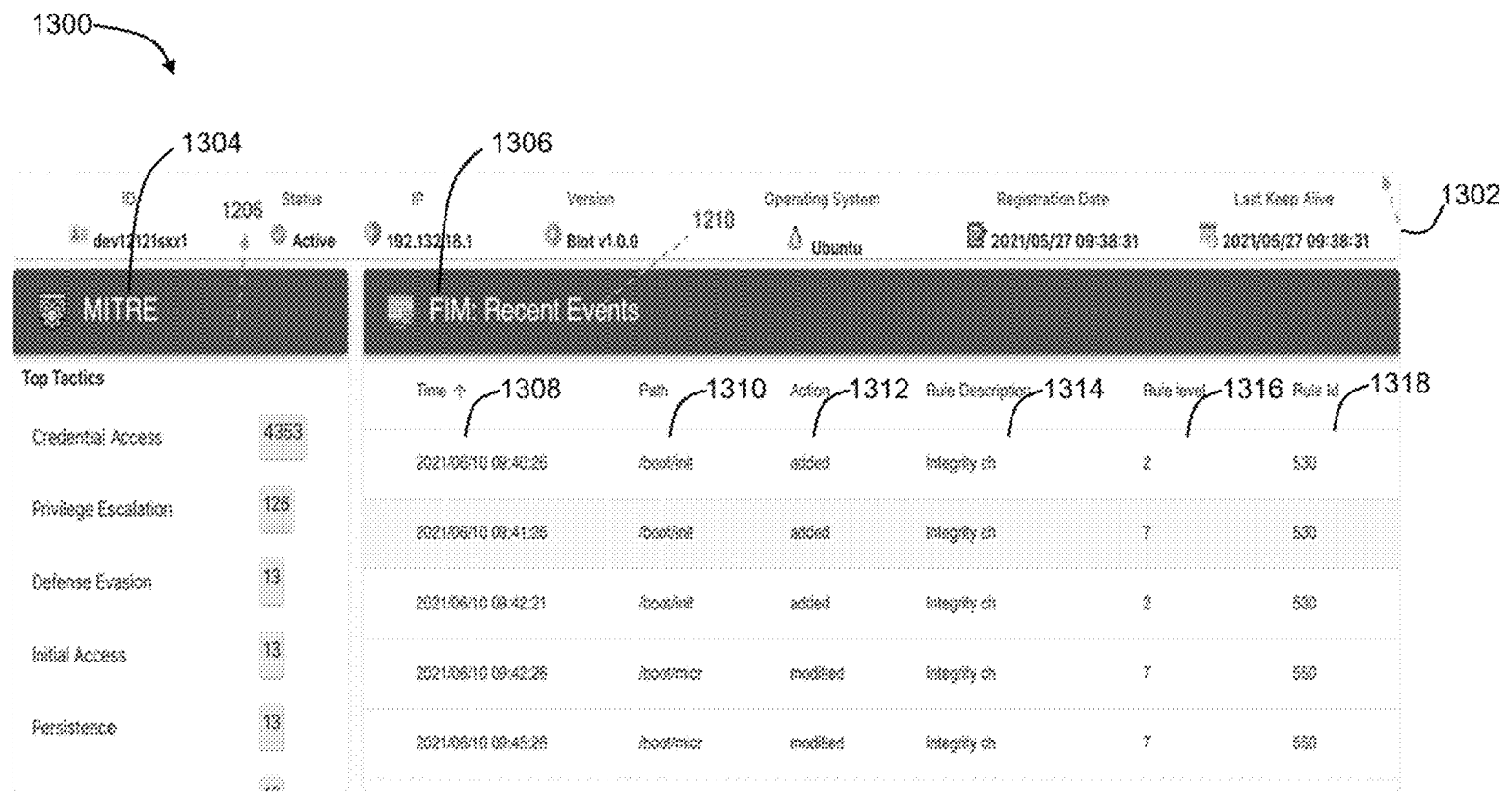

Referring to FIG. 13, illustrated therein is a screen capture 1300 of an example of a user interface providing security analysis and intrusion detection services on data transactions conducted by a device, according to an embodiment. For the purposes of this section, BIoT device refers to a BIoT device 106 registered on system 100 and connected to BIoT server platform 128 depicted in FIG. 1. The screen capture reflects services offered to an organization enrolled on the system 100. It is to be understood that an authorized user from the organization makes selections on the user interface to perform operations and receive services offered by the system 100.

At 1302, the ID corresponds to the device ID registered on the BIoT server platform and selected for security analysis. Further, 1302 provides the status of connection to the BIoT sever platform, the IP address, the device version, the operating system running on the selected device, the date on which the device was registered on the BIoT server platform, and the last date on which the device was connected is displayed.

MITRE 1304 reflects the tactics and the frequency of tactics used by a hacker to gain unauthorized access to the system.

FIM: Recent events 1306 may represent File Integrity Monitoring and recent actions performed by the device, time of action, nature of action (deletion, addition), and level of action performed based on organizational policy.

Events may refer to activities or intrusions occurring on the BIoT device or BIoT network, wherein the event is inconsistent with the intrusion detection rules. The intrusion detection rules may refer to the industry standards requirements such as PCI DSS, GDPR.

Time 1308 may refer to the time of the occurrence of the recent event on the device.

Path 1310 may refer to the file location of the occurrence of the recent event. The path may refer to a location on the device or the cloud.

Action 1312 may refer to the recent event performed. Alternatively, action 1312 may refer to the response taken to counter the threat on the network.

Rule Description 1314 may refer to the industry standard's requirement/statement about the rule.

Rule level 1316 may refer to the severity of the alert as per industry standards for example PCI DSS standard. Level 0 may refer to the lowest priority, whereas Level 7 may refer to a higher priority than Level 0.

Rule ID 1318 may refer to the identification information of the rule.

The system described herein may be further configured to display 'Top 5 Rule Groups' to reveal top 5 key security threats against an industry standard witnessed by the BIoT network, 'Requirement rules for PCI DSS', which may refer to the rules dynamically generated to comply with the industry standard to counter key security threats against an industry standard witnessed by the BIoT network.

The system described herein may be further configured to display stored intrusion detection rules, according to an embodiment. For example, a use of label, "PCI DSS" refers to the operational and technical requirements set forth by Payment Card Industry Data Security Standard (PCI DSS) as required from entities holding cardholder data. The label "Requirements" may include codified rule sets of PCI DSS requirements to be used in the intrusion detection system described herein while monitoring network traffic.

"File" may refer to the identification information or location of the file which has witnessed an event. "Last modified" may refer to the date and time of the most recent change made to the file 1502. "User" may refer to the username. "User ID" may refer to the identification information of the user. "Group" may refer to the group or department to which the user belongs. "Group ID" may refer to the identification information of the group or department to which the user belongs. "Permissions" may refer to the system privileges of the user. "Size" may refer to the storage space consumed by the file.

Figure 14:
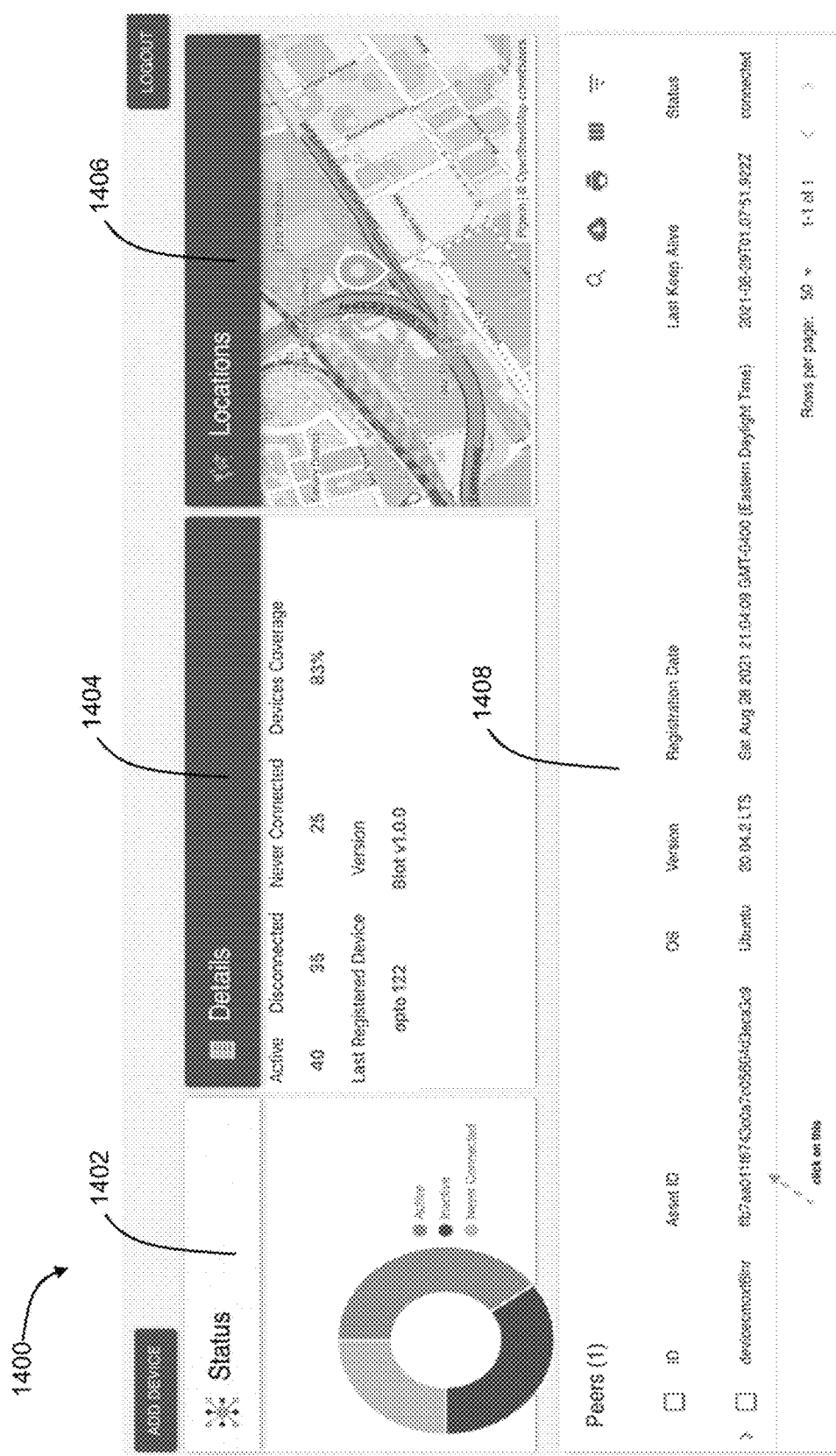
FIG. 14 illustrates a screen capture 1400 of an example of a user interface providing security analysis and intrusion detection services on data transactions conducted by a device, according to an embodiment.

Referring to FIG. 14, illustrated therein is a screen capture 1400 of an example of a user interface providing security analysis and intrusion detection services on data transactions conducted by a device, according to an embodiment. For the purposes of this section, BIoT device refers to a BIoT device 106 registered on system 100, and connected to BIoT server platform 128 depicted in FIG. 1. The screen capture reflects services offered to an organization enrolled on the system 100. It is to be understood that an authorized user from the organization makes selections on the user interface to perform operations and receive services offered by the system 100.

At 1402, Status corresponds to the logging activity of the BIoT devices registered to an organization and enrolled on the plurality of blockchain channels. The pie chart presents the comparative share of BIoT devices which are active, inactive, and never connected. "Active" devices may refer to BIoT devices relaying data in real-time or performing operational instructions. The activity status of the BIoT device may be determined by the status of connection of the BIoT device with the BIoT server platform. Additionally, the activity status of the BIoT device may be determined by the status of connection of the BIoT device with each or any one of the plurality of blockchain channels. "Inactive" BIoT devices may refer to the BIoT device enrolled on the plurality of blockchain channels but not executing any operation in real-time. The "Never Connected" BIoT device may refer to the BIoT devices enrolled by the organization, but the BIoT devices have not performed any operation on the BIoT server platform or on each or any one of the plurality of blockchain channels.

At 1404, quantified valued are presented BIoT devices registered to an organization and enrolled on the plurality of blockchain channels. Namely, number of BIoT devices active, disconnected/inactive, and never connected is presented. "Last Registered Device" represents the device name or identification information of the most recent BIoT device registered to an organization and enrolled on the plurality of blockchain channels.

At 1406, geolocation of the BIoT device is provided. The geolocation may be provided using a JavaScript API.

At 1408, peer information is provided. According to an embodiment, the plurality of blockchain channels may be implemented by the plurality of BIoT devices configured as peers. The peer information includes:

ID: Device ID registered on the BIoT server platform;
Asset ID: Information provided by the user to identify the device with respect to the location of the deployment of the device;
"OS": Operating system running on the BIoT device;
"Version": Version issued by the manufacturer of the BIoT device;
Registration Date: Date of registration to an organization and enrolment on the plurality of blockchain channels;
Last Kept Alive: Most Recent Activity Status; and
Status: The real-time connection and data transmission state of the registered BIoT device.

While the above description provides examples of one or more apparatus, methods, or systems, it will be appreciated that other apparatus, methods, or systems may be within the scope of the claims as interpreted by one of skill in the art.

Rule-based intrusion detection system reduces the consumption of computer resources including storage, energy, and processing cycles. Additionally, the network traffic is monitored in real time and any violation of intrusion detection rules is swiftly detected to prevent unauthorized access. The intrusion detection rules stored on the server detects and prevents suspicious activity at network interface in events where the IoT device or the front-end device is compromised. The immutable blockchain ledger automatically stores a historical record of data files and transactions performed. This obviates the need for maintaining or storing a reference database. Further, attempts to manipulate audit logs and reversing timestamps are prevented for data stored on the blockchain channel.

The invention claimed is:

1. A computer system for building a trusted network of devices, the system comprising:
   a plurality of blockchain channels configured as distinct distributed blockchain ledgers, wherein each of the plurality of blockchain channels corresponds to a respective server configured to perform specific operations for security and access control of a plurality of IoT (Internet of Things) devices, the plurality of blockchain channels including:
      an authentication blockchain channel comprising a plurality of peer nodes configured to:
         register the plurality of IoT devices by storing a unique identifier corresponding to the plurality of IoT devices;
         authenticate the plurality of IoT devices attempting to connect to the plurality of blockchain channels by verifying the unique identifier of the plurality of IoT devices; and
         permit the plurality of IoT devices to access the plurality of blockchain channels after successful authentication;
      wherein the authentication blockchain channel includes a blockchain IoT (BIoT) peer node communicatively connected to and discoverable by the plurality of peer nodes, wherein the BIoT peer node is configured to allow communication between the plurality of peer nodes, and wherein the BIoT peer node is configured to send a transaction to the plurality of peer nodes;
      a data blockchain channel configured to generate and store a cryptographic hash of every data set transacted on the plurality of blockchain channels; and
      a security blockchain channel configured to store any one or more of a plurality of security log records, transaction logs, data access requests, and timestamped hash files, of the plurality of IoT devices to provide a secure record for data audits; and
   a blockchain server platform including:
      an authentication server outside of and connected to the authentication blockchain channel and the plurality of IoT devices;
      a data server outside of and connected to the data blockchain channel and the plurality of IoT devices; and
      a security server outside of and connected to the security blockchain channel, and the plurality of IoT devices;
   wherein the authentication server, the data server, and the security server are physically and logically separate from one another.

2. The system of claim 1, further comprising:
   a remote blockchain channel is configured to:
      store an organizational policy corresponding to a plurality of registered IoT devices, wherein the plurality of registered IoT devices include the plurality of IoT devices registered on the authentication blockchain channel;
      receive an operation request from the plurality of IoT devices;
      verify whether the operation request is received from the plurality of registered IoT devices and the operation request is permitted by the organizational policy; and
      permit the operation request on successful verification;
   wherein:
      the authentication server is configured to decrypt a registration request to extract the unique identifier of the plurality of IoT devices and a data interaction request received from the plurality of IoT devices, wherein the authentication server verifies the unique identifier with a record of registered devices stored on the authentication blockchain channel;
      the data server is configured to decrypt an incoming data from the plurality of IoT devices and communicating the incoming data to the plurality of blockchain channels;
      the remote server is configured to perform remote management operation by directly connecting a frontend device the plurality of IoT devices and the remote blockchain channel for transmission of the operation request; and
      wherein the security server is configured to process the operation request for providing the device logs and verify regulatory compliance of the plurality of IoT devices based on the intrusion details; and
      wherein a registration status and authentication data of either of the plurality of IoT devices is communicated to the plurality of blockchain channels by the authentication blockchain channel.

3. The system of claim 2 further comprising a plurality of blockchain orderers configured to synchronize a plurality of nodes on the plurality of blockchain channels.

4. The system of claim 1 further comprising a plurality for certification authorities configured to:

generating a plurality of digital certificates for the plurality of IoT devices; and validating the plurality of digital certificates for verifying the plurality of IoT devices.

5. The system of claim 1, wherein the plurality of blockchain channels are developed on Hyperledger Fabric.

6. The system of claim 1, wherein the plurality of blockchain channels further includes an encrypted data streaming blockchain channel configured to:
- receive and decrypt a data stream from either one or more of a Programmable Logic Controllers (PLC) or the plurality of IoT devices;
- authenticate a device wallet identity, wherein the device wallet identity includes the unique identifier; and
- store a decrypted data stream from either one or more of the Programmable Logic Controllers (PLC) or the plurality of IoT devices in a data lake server.

7. The system of claim 2, wherein the operation request is further configured as a smart contract.

8. The system of claim 2, wherein the operation request includes analyzing device logs, an intrusion detection report wherein the intrusion detection report includes an event of unsuccessful authentication of the plurality of IoT devices, a list of the plurality of registered IoT devices, a system audit, feeding data into the plurality of blockchain channels, activating a sensor connected to the plurality of IoT devices to feed data into the blockchain channels, performing conditional statement or triggering a smart contract.

9. The system of claim 3, wherein the organizational policy includes requirements for permitted operation request, data sharing protocols, encryption protocols for data storage and access, power allocation to the plurality of nodes, and permitted device operations.

10. A computer-implemented method for building a trusted network of devices, the method comprising:
- enrolling an organization on a blockchain server platform connected to a plurality of blockchain channels configured as distinct distributed blockchain ledgers wherein each of the plurality of blockchain channels corresponds to a respective server configured to perform specific operations for security and access control of a plurality of IoT (Internet of Things) devices, the plurality of blockchain channels including an authentication blockchain channel comprising a plurality of peer nodes connected to an authentication server outside the authentication blockchain channel and to the plurality of IoT devices, a data blockchain channel connected to a data server outside the data blockchain channel, and a security blockchain channel connected to a security server outside the security blockchain channel;
- wherein the authentication server, the data server, and the security server are physically and logically separate from one another;
- registering, on the authentication blockchain channel, the plurality of IoT (Internet of Things) devices by storing a unique identifier corresponding to the plurality of IoT devices;
- authenticating, on the authentication blockchain channel, the plurality of IoT devices attempting to connect to the plurality of blockchain channels by verifying the unique identifier of the plurality of IoT devices;
- permitting, by the authentication blockchain channel, the plurality of IoT devices access the plurality of blockchain channels after successful authentication;
- generating and storing, by the data blockchain channel, a cryptographic hash of every data set transacted on the plurality of blockchain channels; and
- storing, by the security blockchain channel, any one or more of a plurality of security log records, transaction logs, data access requests, and time-stamped hash files of the plurality of IoT devices to provide a secure record for data audits;
- wherein the authentication blockchain channel includes a blockchain IoT (BIoT) peer node communicatively connected to and discoverable by the plurality of peer nodes, wherein the BIoT peer node is configured to allow communication between the plurality of peer nodes, and wherein the BIoT peer node is configured to send a transaction to the plurality of peer nodes.

11. The method of claim 10, wherein the method further comprises:
- storing, by a remote blockchain channel, an organizational policy corresponding to a plurality of registered IoT devices, wherein the plurality of registered IoT devices include the plurality of IoT devices registered on the authentication blockchain channel;
- receiving, by the remote blockchain channel, an operation request from the plurality of IoT devices;
- verifying, by the remote blockchain channel, whether the operation request is received from the plurality of registered IoT devices and the operation request is permitted by the organizational policy;
- permitting, by the remote blockchain channel, the operation request on successful verification;
- registering the plurality of IoT (Internet of Things) devices on the blockchain server platform by storing a wallet identity for each of the plurality of IoT (Internet of Things) devices on the plurality of blockchain channels, wherein the wallet identity includes the unique identifier;
- authenticating the plurality of IoT devices using the wallet identity by receiving an endorsement by a plurality of peer nodes on the plurality of blockchain channels;
- collecting on the blockchain server platform a device data received from a plurality of sensors on the plurality of IoT devices;
- encrypting the device data and simultaneously storing the device data on the plurality of blockchain channels;
- updating the plurality of peer nodes with an updated version of the device data; and
- retrieving the device data upon receiving the operation request for a plurality of authenticated IoT devices;
- wherein: the authentication server is configured to decrypt a registration request to extract the unique identifier of the plurality of IoT devices and a data interaction request received from the plurality of IoT devices, wherein the authentication server verifies the unique identifier with a record of registered devices stored on the authentication blockchain channel;
- the data server is configured to decrypt an incoming data from the plurality of IoT devices and communicating the incoming to the plurality of blockchain channels;
- the remote server is configured to perform remote management operation by directly connecting a frontend device in the plurality of IoT devices and the remote blockchain channel for transmission of the operation request; and the security server is configured to process the operation request for providing the device logs and verify regulatory compliance of the plurality of IoT devices based on the intrusion details;

wherein a registration status and authentication data of the either of the plurality of IoT devices is communicated to the plurality of blockchain channels by the authentication blockchain channel.

12. The method of claim 10, further comprising synchronizing the plurality of peer nodes using a plurality of blockchain orderers.

13. The method of claim 10, wherein the method further comprises:

receiving and decrypting, by an encrypted data streaming blockchain channel, a data stream from either one or more of a Programmable Logic Controllers (PLC) or the plurality of IoT devices;

authenticating the wallet identity by the encrypted data streaming blockchain; and storing, by the encrypted data streaming blockchain channel, a decrypted data stream from either one or more of the Programmable Logic Controllers (PLC) or the plurality of IoT devices in a data lake server.

14. The method of claim 10, further comprising issuing a plurality of random session token after successful authentication of the plurality of IoT devices, wherein the plurality of random session token includes a set of logical instructions to be performed based on the operation request received from the plurality of IoT devices.

15. The method of claim 10, wherein the plurality of sensors include a temperature sensor, a pressure sensor, a proximity sensor, an accelerometer and gyroscope sensor, an IR sensor, an optical sensor, an illumination sensor, a humidity sensor, a motion sensor, a sound sensor, a magnetic sensor, and an air quality sensor.

16. The method of claim 11, wherein the operation request includes analyzing device logs, an intrusion detection report wherein the intrusion detection report includes an event of unsuccessful authentication of the plurality of IoT devices, a list of the plurality of registered IoT devices, a system audit, feeding data into the plurality of blockchain channels, activating a sensor connected to the plurality of IoT devices to feed data into the blockchain channels, performing conditional statement or triggering a smart contract.

17. A computer-implemented method for building a trusted network of devices, the method comprising:

performing an operation at a frontend device and sending operation request to a blockchain server platform and a plurality of blockchain channels configured as distinct distributed blockchain ledgers wherein each of the plurality of blockchain channels corresponds to a respective server configured to perform specific operations for security and access control of a plurality of IoT (Internet of Things) devices, the plurality of blockchain channels including an authentication blockchain channel comprising a plurality of peer nodes connected to an authentication server outside the authentication blockchain channel and to the plurality of IoT devices, a data blockchain channel connected to a data server outside the data blockchain channel, and a security blockchain channel connected to a security server outside the security blockchain channel, wherein the authentication server, the data server, and the security server are physically and logically separate from one another; and validating access permissions of the frontend device and the operation request according to an organizational policy and a wallet identity of the frontend device;

sending the operation request to the plurality of IoT devices in encrypted format on successful validation;

decrypting of the operation request by the plurality of IoT devices and executing of the operation request by the plurality of IoT devices;

sending an operation result to the blockchain server platform and the plurality of blockchain channels; and storing a record of the operation result to the plurality of blockchain channels;

wherein the authentication blockchain channel includes a blockchain IoT (BIoT) peer node communicatively connected to and discoverable by the plurality of peer nodes, wherein the BIoT peer node is configured to allow communication between the plurality of peer nodes, and wherein the BIoT peer node is configured to send a transaction to the plurality of peer nodes.

18. The method of claim 17, wherein the plurality of blockchain channels include:

the authentication blockchain channel is configured to:
register the plurality of IoT devices by storing the wallet identity corresponding to the plurality of IoT devices;
authenticate the plurality of IoT devices attempting to connect to the plurality of blockchain channels by verifying the wallet identity of the plurality of IoT devices;
permit the plurality of IoT devices access the plurality of blockchain channels after successful authentication;

the data blockchain channel is configured to:
generate and store a cryptographic hash of every data set transacted on the plurality of blockchain channels;

a remote blockchain channel is configured to:
store the organizational policy corresponding to the plurality of registered IoT devices, wherein the plurality of registered IoT devices include the plurality of IoT devices registered on the authentication blockchain channel;
receive an operation request from the plurality of IoT devices;
verify whether the operation request is received from the plurality of registered IoT devices and the operation request is permitted by the organizational policy;
permit the operation request on successful verification; and the security blockchain channel is configured to:
store any one or more of a plurality of security log records, transaction logs, data access requests, and time-stamped hash files, of the plurality of IoT devices to provide a secure record for data audits;

the authentication server is configured to decrypt a registration request to extract a unique identifier of the plurality of IoT devices and a data interaction request received from the plurality of IoT devices, wherein the authentication server verifies the unique identifier with a record of registered devices stored on the authentication blockchain channel;

the data server is configured to decrypt an incoming data from the plurality of IoT devices and communicating the incoming data to the plurality of blockchain channels;

the remote server is configured to perform remote management operation by directly connecting the frontend device to the plurality of IoT devices and the remote blockchain channel for transmission of the operation request;

the security server is configured to: process the operation request for providing device logs and verify regulatory compliance of the plurality of IoT devices based on intrusion details; and wherein a registration status and authentication data of any of the plurality of IoT devices is communicated to the plurality of blockchain channels by the authentication blockchain channel.

19. The method of claim 17, wherein the method further comprises:
- receiving and decrypting, by an encrypted data streaming blockchain channel, a data stream from either one or more of a Programmable Logic Controllers (PLC) or the plurality of IoT devices;
- authenticating the wallet identity by the encrypted data streaming blockchain; and
- storing, by the encrypted data streaming blockchain channel, a decrypted data stream from either one or more of the Programmable Logic Controllers (PLC) or the plurality of IoT devices in a data lake server.

20. The method of claim 17, further comprising:
issuing a plurality of encryption keys from the blockchain server platform;
transmitting the plurality of encryption keys the plurality of IoT devices; and
renewing the encryption keys on execution of the operation request by the plurality of loT devices.

* * * * *